March 10, 1970 G. T. RANDOL 3,499,288
VACUUM-OPERATED BRAKE BOOSTER DEVICE
Filed Dec. 5, 1967 10 Sheets-Sheet 1
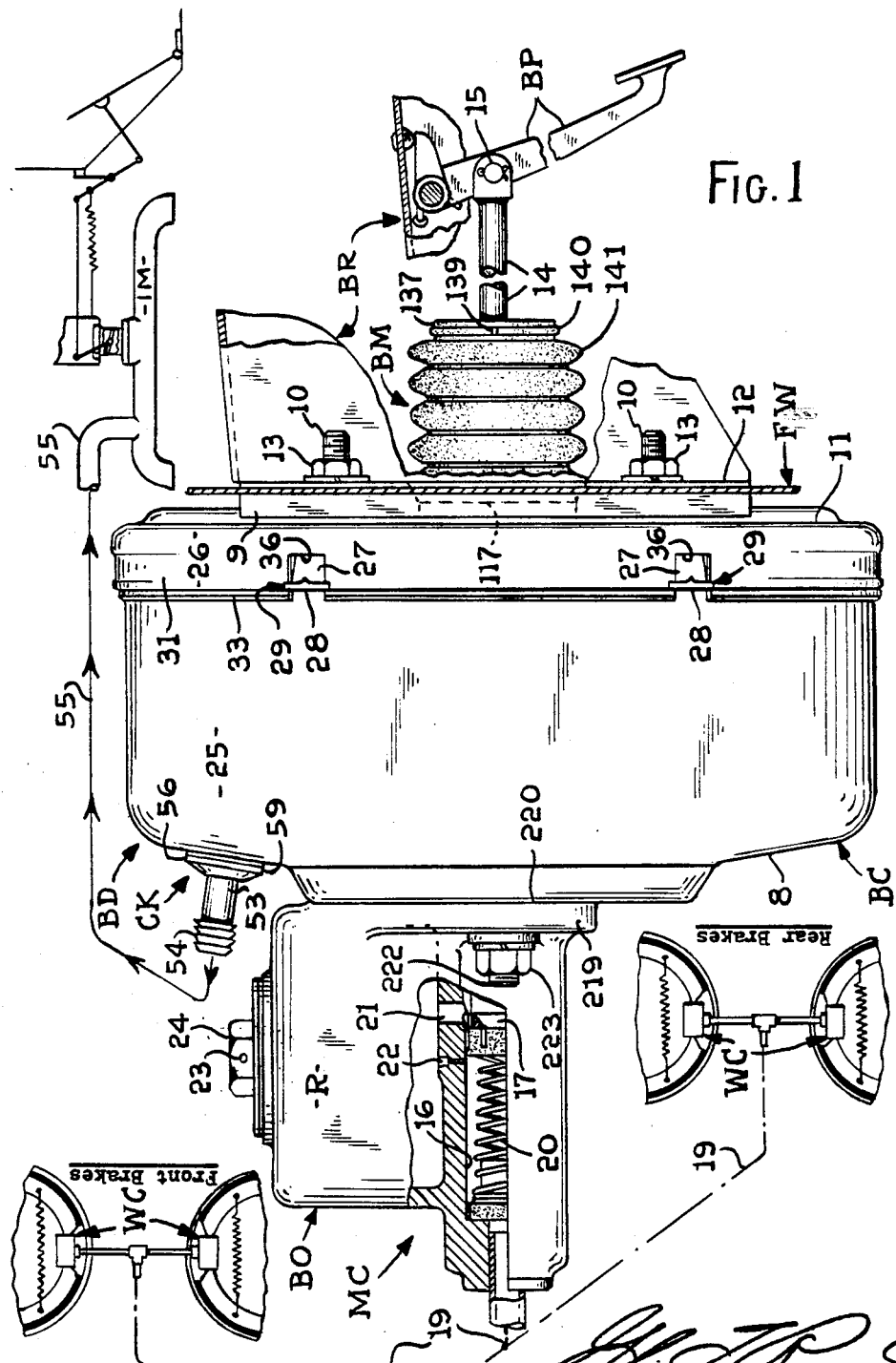

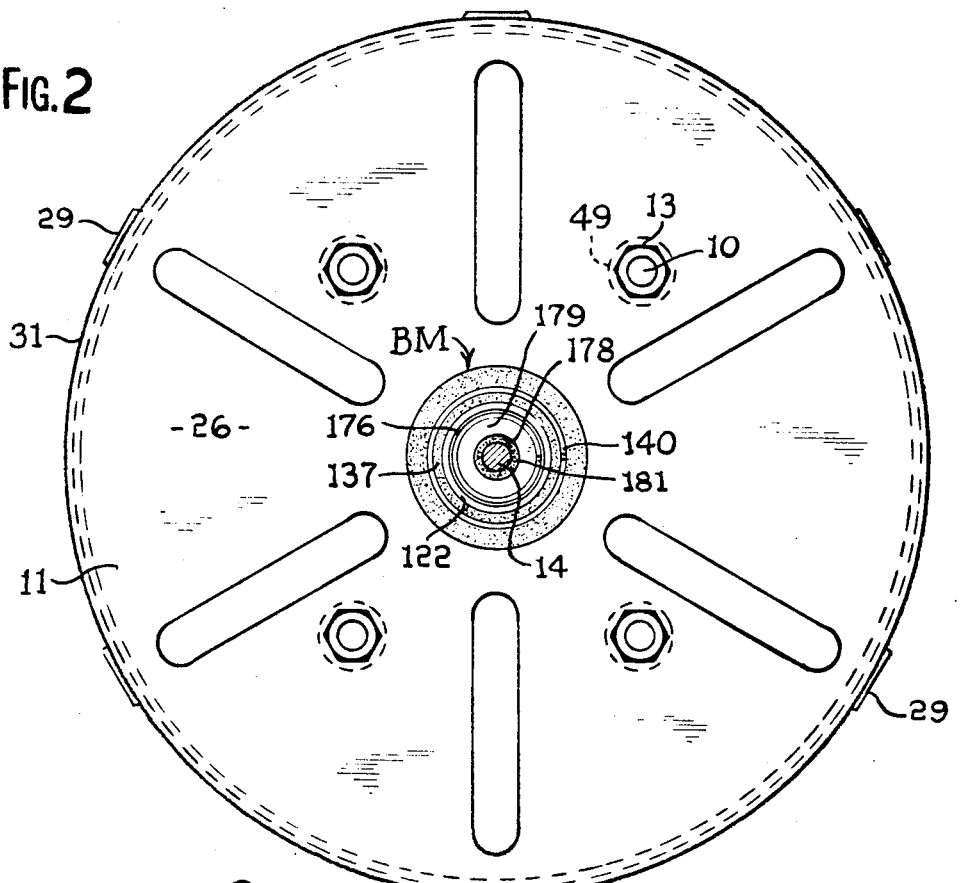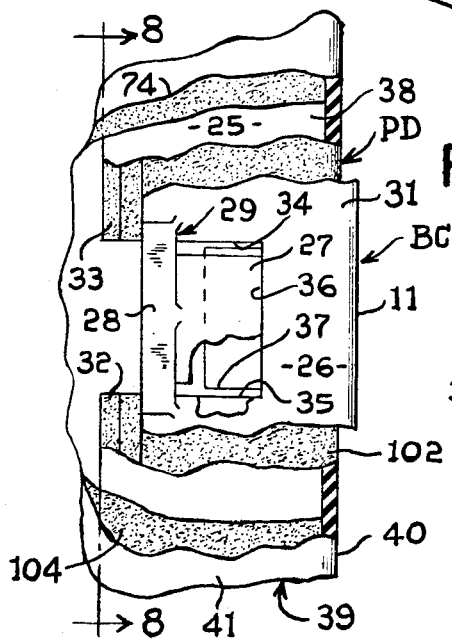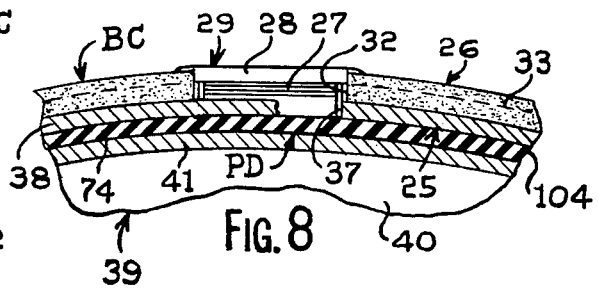

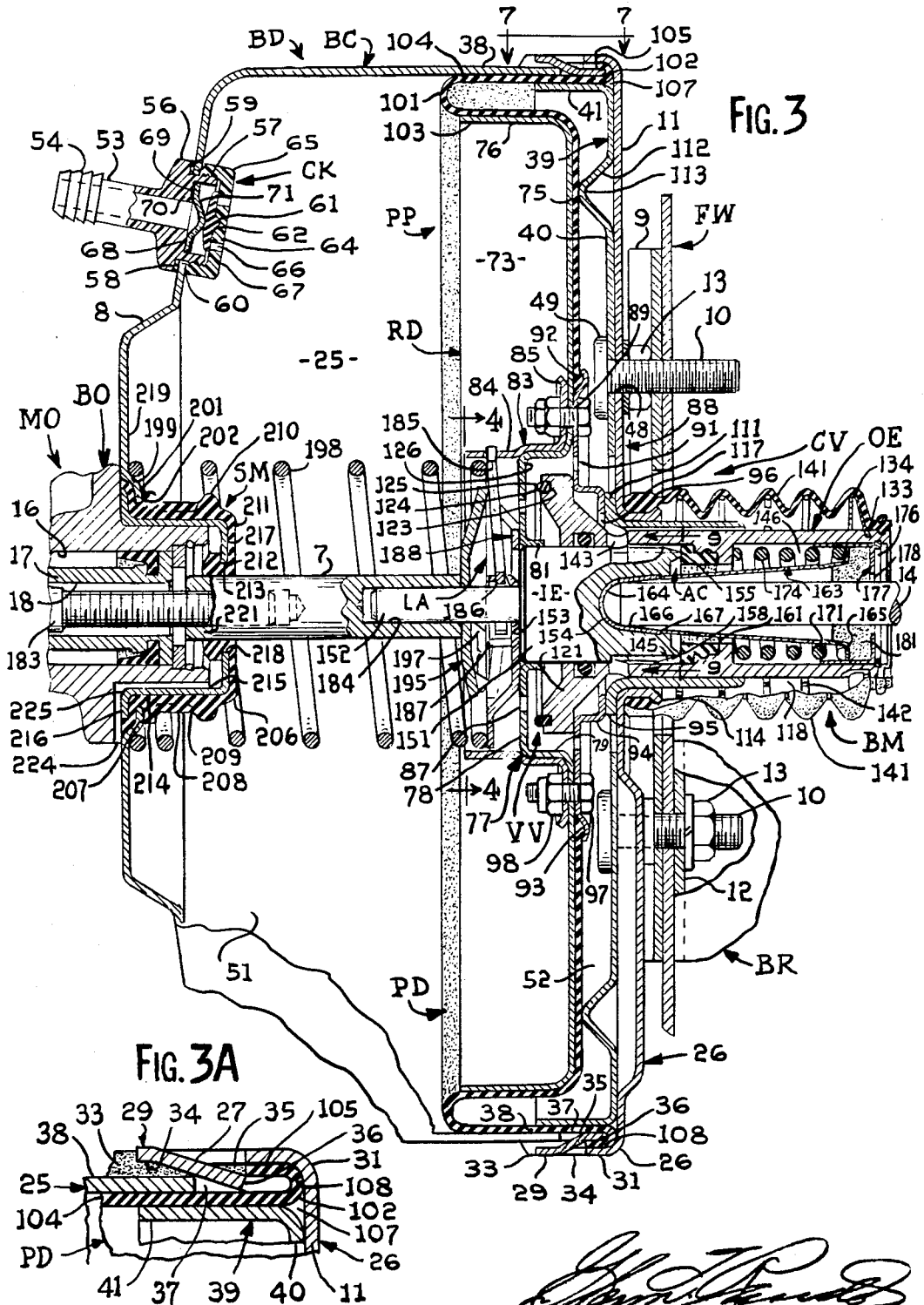

March 10, 1970  G. T. RANDOL  3,499,288
VACUUM-OPERATED BRAKE BOOSTER DEVICE
Filed Dec. 5, 1967  10 Sheets-Sheet 4
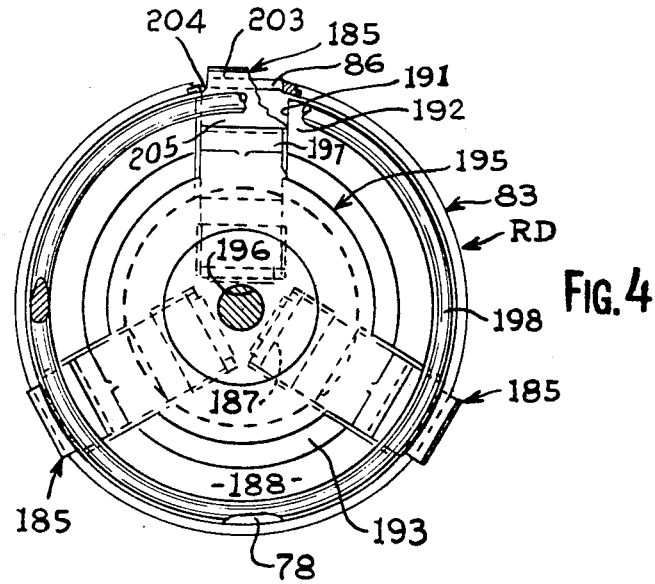
FIG. 4
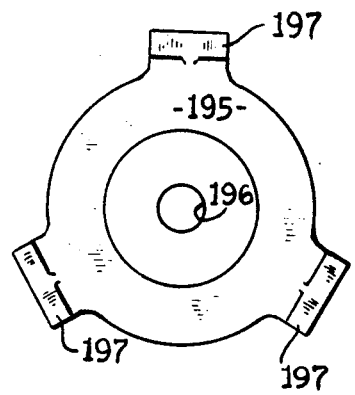
FIG. 5
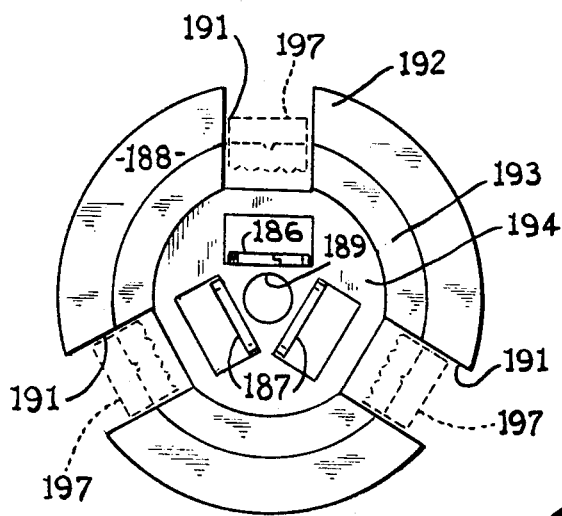
FIG. 6
Inventor

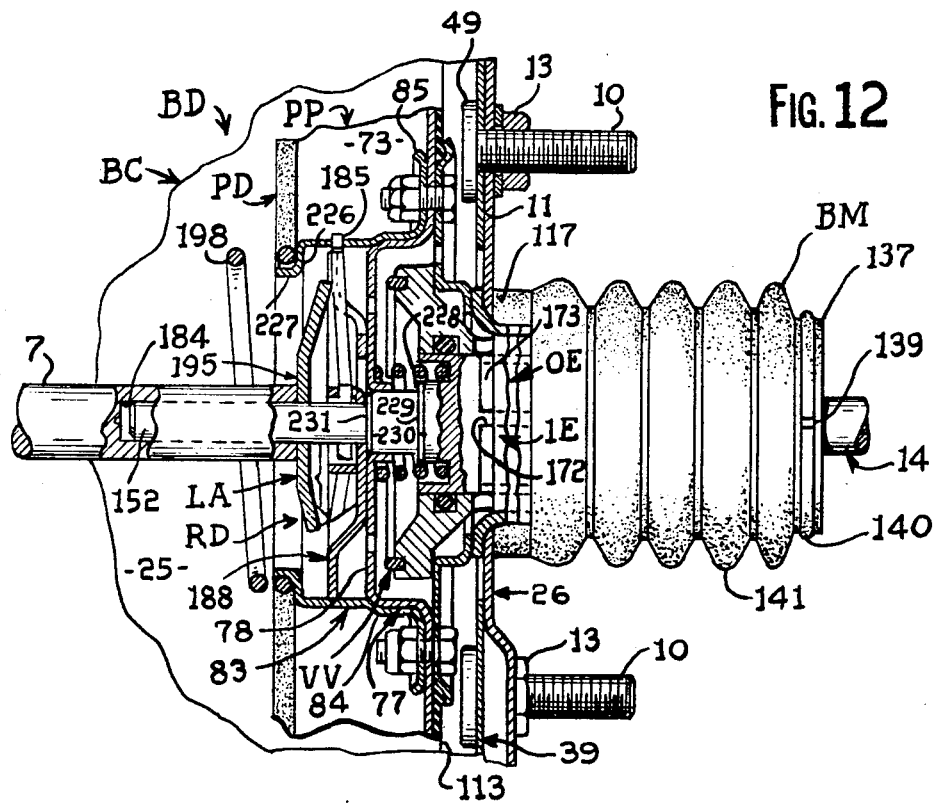
FIG. 12
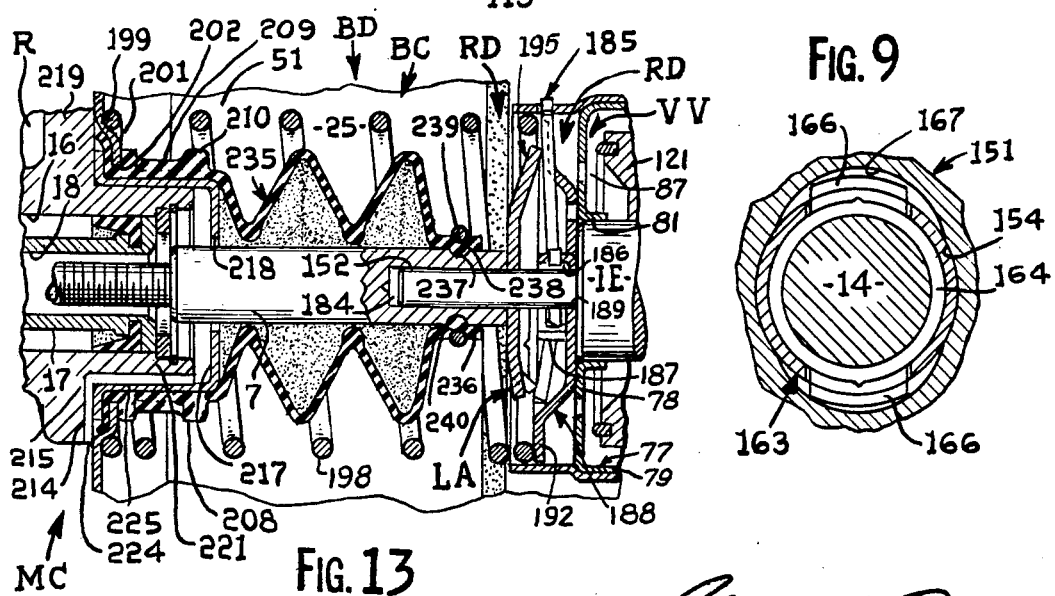
FIG. 13
FIG. 9
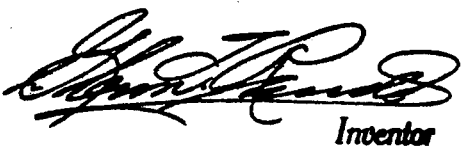
Inventor

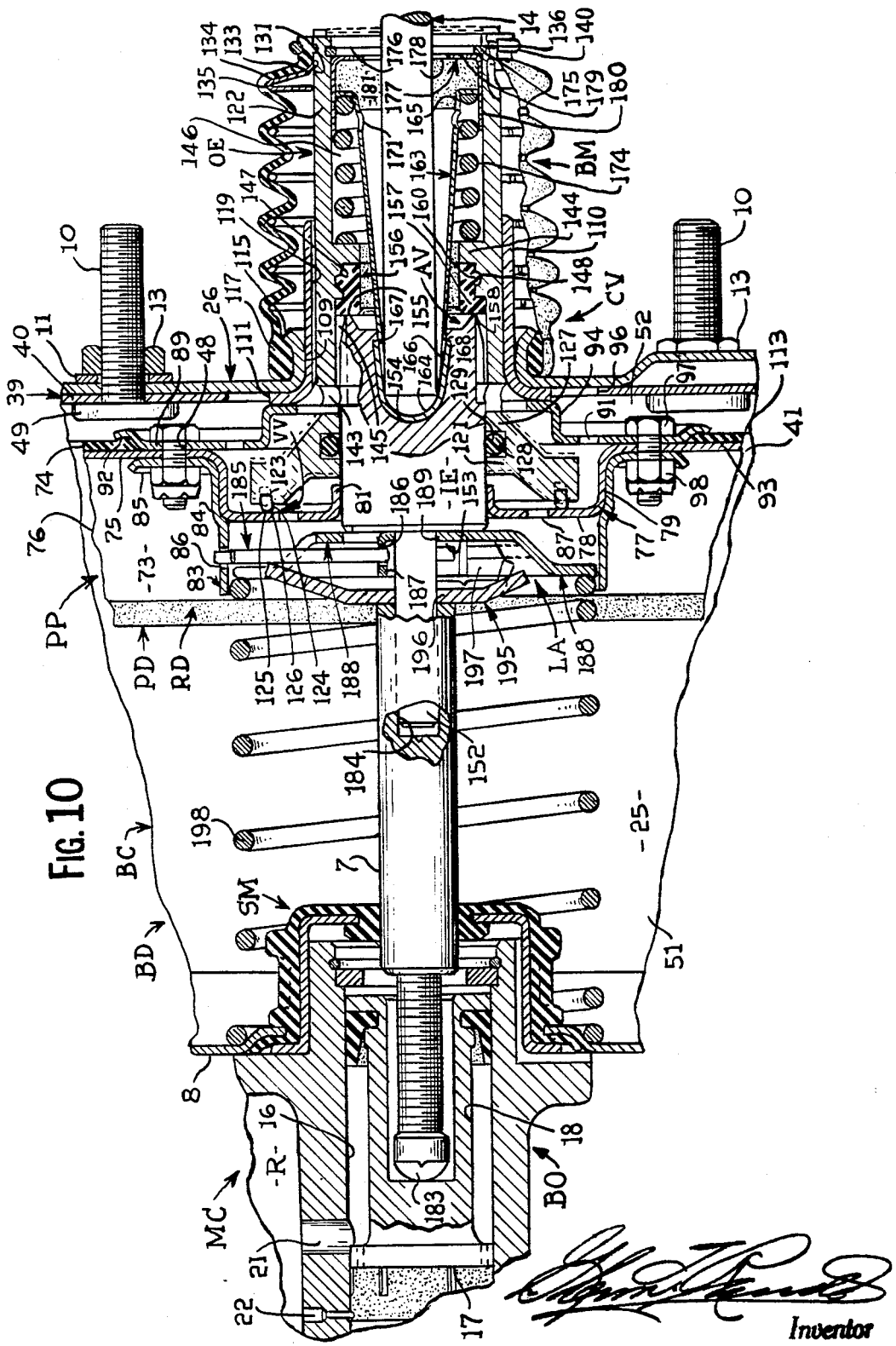

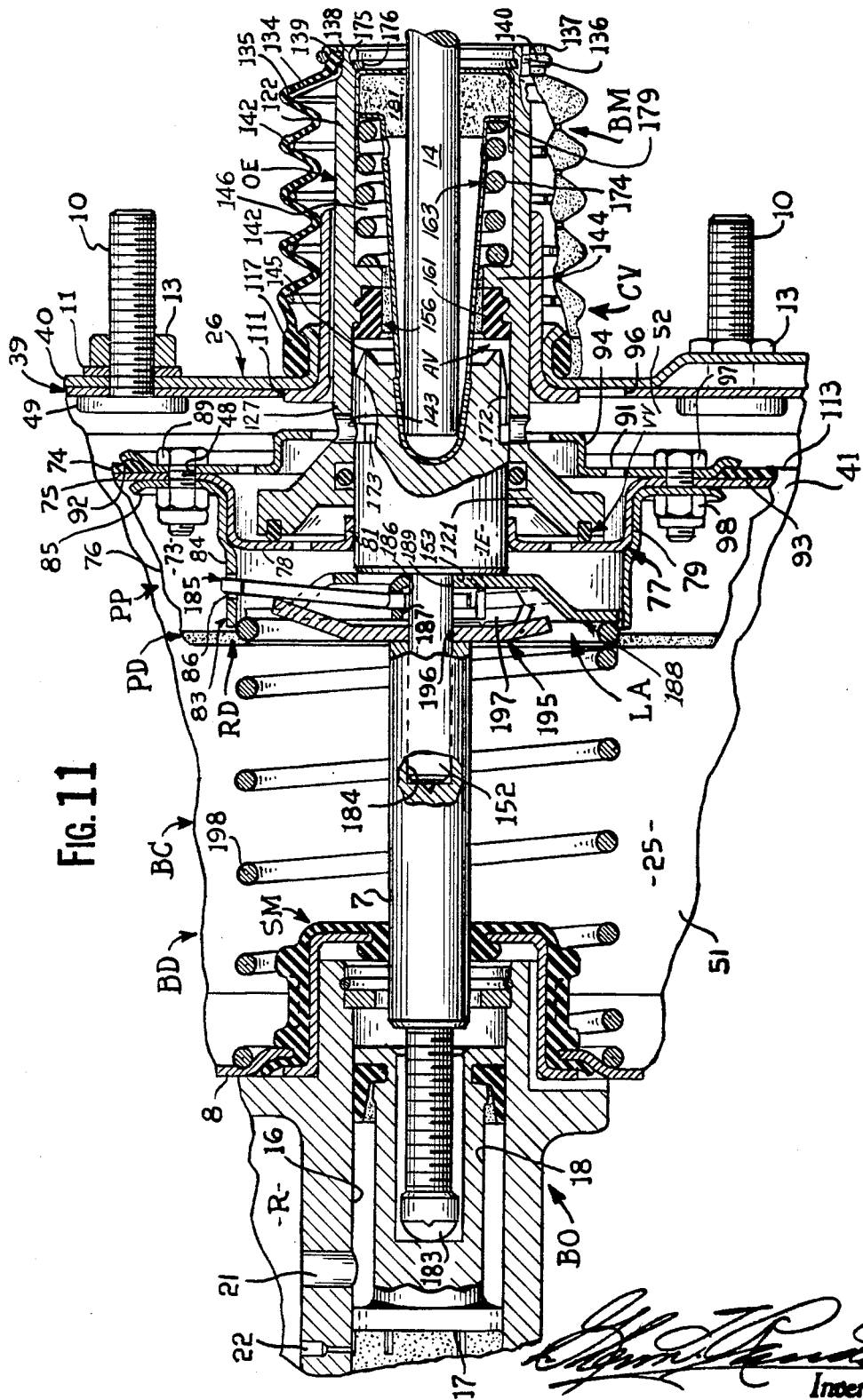

March 10, 1970     G. T. RANDOL     3,499,288
VACUUM-OPERATED BRAKE BOOSTER DEVICE
Filed Dec. 5, 1967     10 Sheets-Sheet 8
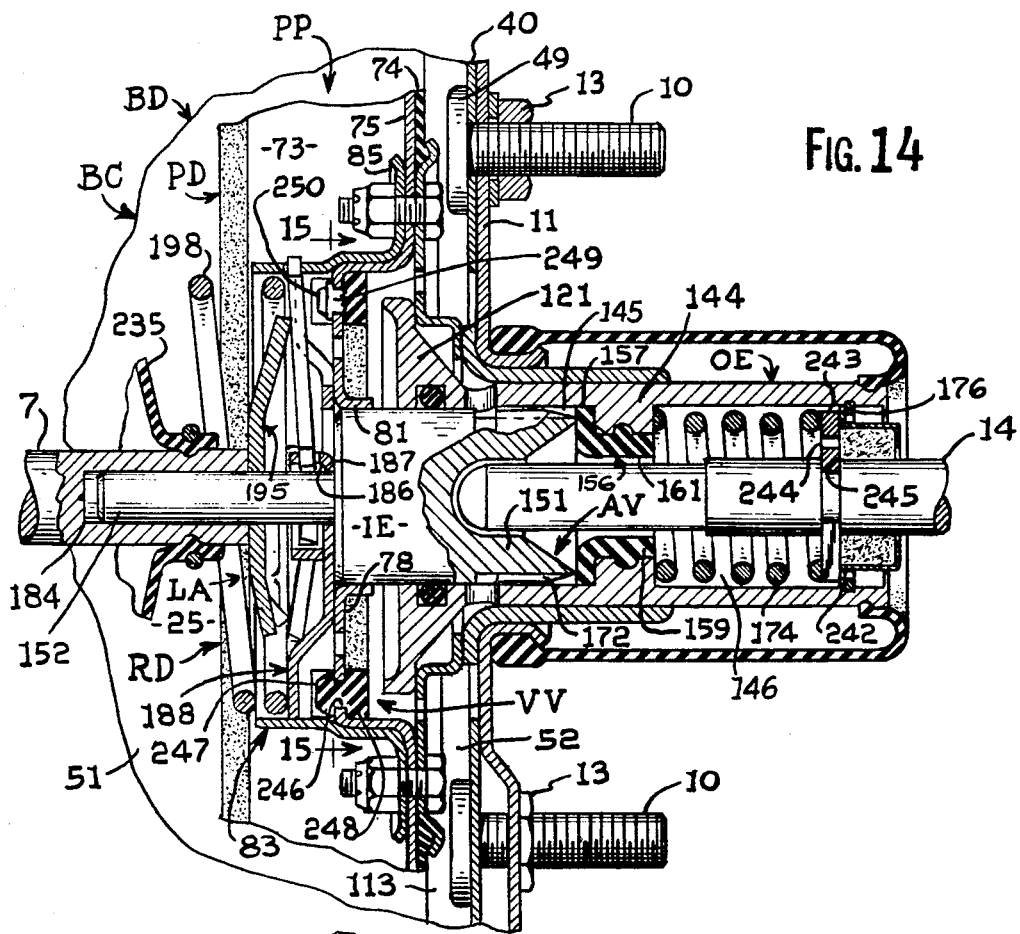
FIG. 14
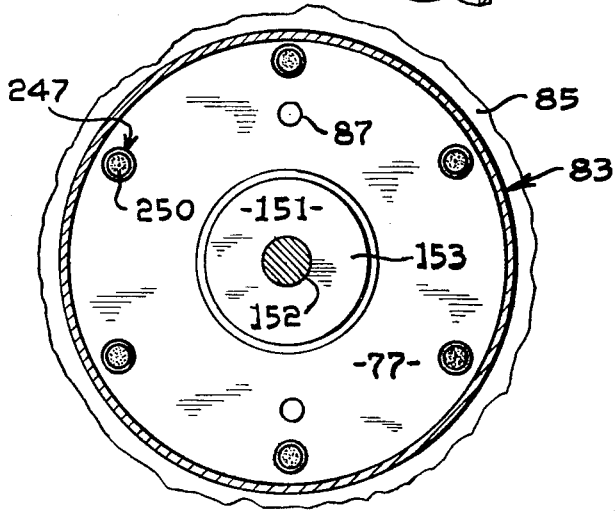
FIG. 15
Inventor March 10, 1970　　　　G. T. RANDOL　　　3,499,288

VACUUM-OPERATED BRAKE BOOSTER DEVICE

Filed Dec. 5, 1967　　　　　　　　　　　10 Sheets-Sheet 9

*Inventor*

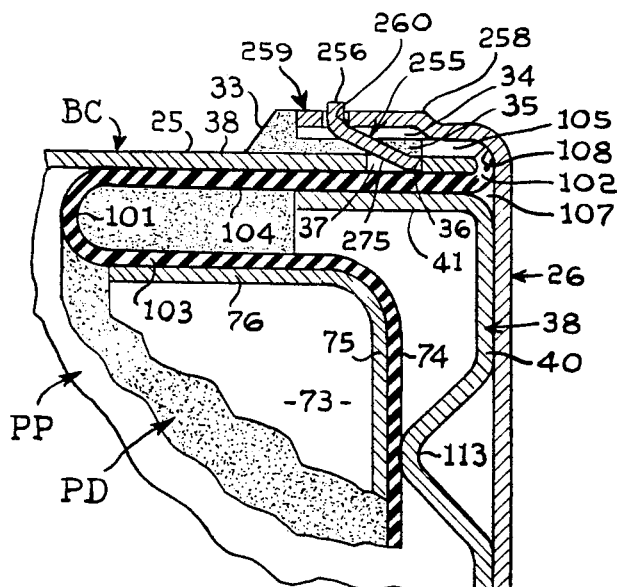
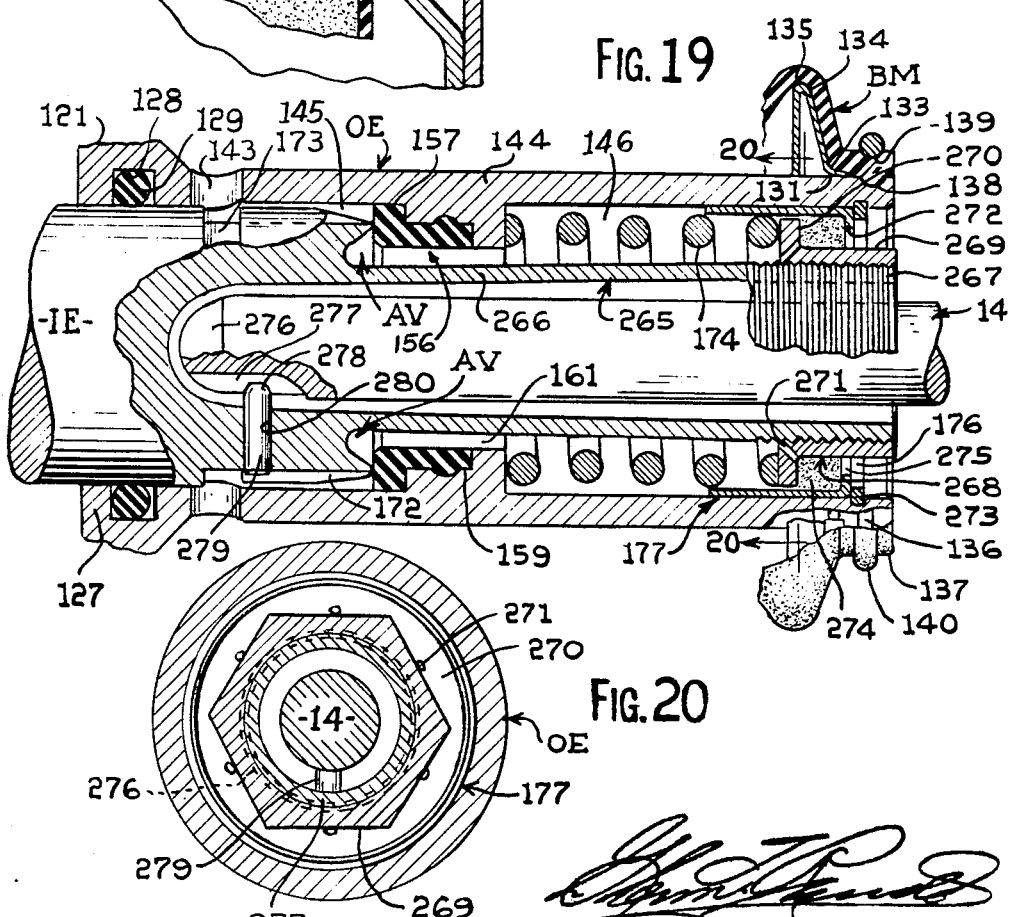

United States Patent Office 3,499,288
Patented Mar. 10, 1970

3,499,288
VACUUM-OPERATED BRAKE BOOSTER DEVICE
Glenn T. Randol, Loch Lynn, Md.
(P.O. Box 275, Mountain Lake Park, Md. 21550)
Filed Dec. 5, 1967, Ser. No. 688,106
Int. Cl. F15b 9/10, 7/08
U.S. Cl. 60—54.6                              42 Claims

ABSTRACT OF THE DISCLOSURE

A vacuum-operated booster device for producing the major portion of the actuating force for vehicular brake systems under manual follow-up control. The device includes a provision for manually taking up the slack in the connected brake system prior to activation of a follow-up control valve to applied position for controlling operative energization of said device; a provision for sealing an operably related master cylinder to said device in metal-to-metal stabilized relationship; and a provision for anchoring the peripheral margin of a flexible power-diaphragm in said device.

---

This invention relates generally to pressure differential operated booster servo-motors, and more particularly to servo-motors of the vacuum-suspended type having utility in motor vehicles and the like to provide the major portion of the operating force for the hydraulic brake system or the like, thus serving to assist personal (operator) force in controlling such systems with special built-in safety and control features such as a sufficiently capacitated vacuum-power chamber to enable 4 to 5 power-assisted stops after the engine has been turned "off" or stalls, and an improved predictable braking control.

The present invention seeks to produce an improved booster motor of the general type disclosed in U.S. Patents 2,977,935; 3,072,106; 3,101,032 and 3,175,235 granted to me Apr. 4, 1961, Jan. 8 and Aug. 20, 1963, and Mar. 30, 1965, respectively.

U.S. Patents 3,101,032 and 3,175,235 above referred to, disclose novel reaction or force-transmitting mechanism characterized by a plurality of radially-disposed levers (fingers) which are incapable of rocking on pressure points for transmission of reaction from the operably related master brake cylinder when in their relaxed status normal to the axis of said mechanism due to the inner end portions of said levers being in surface contact with like surfaces on the pressure plate for transmitting force to the work-performing element, and the power member, which condition negates the aforesaid pressure points (lines) on which the levers can rock intermediately of their extremes and at opposite ends thereof, operation of said levers in normal position and the operably related control valve device which is under a predetermined spring-load within, and the servo-power assembly (piston) as a unit being required under initial operator-actuation to take up the slack (backlash) in the brake system sufficiently to restrict or close the compensating port in the master cylinder, and thereby creating a predetermined resistance from the fluid column in accordance with the force-transmitting capacity of the spring-load aforesaid to substantially halt such unitary movement of the three aforesaid components; whereupon additional operator force applied to the control valve device in opposition to said fluid resistance is effective to overcome said spring-load for relative movement of the two telescopically-related fluid-controlling elements comprising said valve device and to simultaneously tilt the reaction-levers at an angle to the axis of said mechanism accompanied by spatial separation of the aforesaid pressure plate and servo-power piston according to the degree of tilt of said levers under operator-actuation whereby the angulating disposition of the reaction-levers produces a line contact with said pressure plate enabling said levers to rock intermediately thereon for transmission of reaction from the master cylinder via said work element and on pressure line engagement of said levers at their extremes with said servo-power piston and with a movable member (spring seat) operably related with the outer fluid-controlling element under operator-actuation whereby the servo-power piston is rendered operatively effective to assist operator-actuation in applying the vehicle brakes under smooth blending of power and operator forces proportionally graduated in accordance with the raction leverage ratio in effect for predictable control over a brake-applying operation. The inner extreme of said levers being engageable by said servo-power piston and the outer extreme being acted on by said movable member.

The aforesaid novel force-transmitting mechanism while completely satisfactory for smoothly controlling the power force, introduces an impositive pedal feel, that is, the pedal is characterized by sponginess due to the spatially separated condition between the master cylinder push-rod (pressure plate) and the servo-power piston, such operating characteristic being effective even though a "straight-through" operation of the master cylinder is in effect since all reaction from the latter must necessarily be transmitted through the reaction-levers rather than bypassing the same as is the commercial practice.

A further disadvantage resides in the aforedescribed patented force-transmitting mechanism, is the operable relation of the pair of fluid-controlling elements comprising the control valve device, to the reaction-levers. In my patented arrangement aforesaid, the inner ends of the recation-levers are acted on by the servo-power piston and the outer ends are mechanically acted on by the outer fluid-controlling element via said movable spring seat member which in turn is under brake-pedal actuation. This connection between the outer fluid-controlling element and the reaction-levers, prohibits a direct "straight-through" operation of the master brake cylinder since all operator force must be transmitted through the reaction-lever via the outer ends thereof in tilted disposition causing the pressure plate and servo-power piston to be separated for such reaction transmission, thus producing the aforesaid sponginess.

It is, therefore, the primary objective of the present invention to overcome the aforedescribed disadvantages by providing firmer pedal feel in accordance with the degree of brake-applying force in effect; by operably relating the inner ends of the reaction-levers with the inner fluid-controlling element under manual actuation, to enable a "straight-through" connection between the inner fluid-controlling element and master cylinder work element in the event of power inadequacy or complete failure; by operably associating an improved poppet-type control valve device over that disclosed in U.S. Patent 2,977,935 granted to me Apr. 4, 1961, with said force-transmitting mechanism for distributing proportional reaction from the master cylinder between the operator and power forces, and wherein two principal fluid-controlling elements are telescopically-related with the inner fluid-controlling element mechanically acting on the inner ends of the reaction-levers at all times, thus enabling the latter irrespective of their angulated disposition out of normal position to transmit reaction from the master cylinder upon actuating the control valve device to applied position wherein the booster servo-power piston is under controlled operative energization, the outer fluid-controlling element being adapted to carry an annular resilient valve face capable of deforming sufficiently to insure a degree of overlap between the two fluid-controlling elements in their respective seated (closed) positions for stabilizing the servo-power piston in "brake-holding" position; by utilizing a minimal number of rubber components which by reason of their inherent resilient composition are affected by excessive heat or cold with resultant possible malfunction; and by providing a two-stage movement of the booster work element, the first stage movement being effective to take up the slack (lost-motion) in the working parts without operatively applying the control valve device and to close the master cylinder compensating port to create the aforesaid work resistance to movement of said work element, and the second stage movement being effective under manual actuation of the operator-operated member (brake-pedal) to actuate the control valve device to applied position wherein the booster device is operatively energized to produce power-assisted braking operations.

An object related to the foregoing two-stage movement of said work element, is to produce such movement with the booster servo-power member in normally relaxed disposition or to move the same as a unit with said first stage movement depending on the relative rate of compressive deflection of the spring-load between the servo-power member and inner fluid-controlling element under manual actuation, said unitary movement being effective to negate relative actuation of the reaction-levers aforesaid from their normally relaxed disposition.

An object related to the aforesaid improved control valve device is to provide a relatively large diameter surface contact between said resilient valve face and cooperating valve seat on the servo-power member, effective to correct any axial disalignment between the servo-power member and control valve device, and thereby insuring complete closure of the outer fluid-controlling element under all operating conditions prior to opening of the inner fluid-controlling element.

Another salient feature of my invention is the provision of a novel pressure differential actuator adapted to take up the slack in the operating parts of the booster device automatically, as a function of the power cylinder of the latter being charged with negative (vacuum) pressure insufficient to apply the control valve device for controlling operative energization of the booster servo-power member, said actuator being operably connected to the outer fluid-controlling element of said valve device, and in continuous communication with the variable pressure chamber in said booster power cylinder to actuate said control valve device as a unit without modifying its normal spring load to effect first stage movement aforesaid of said work element prior to initial pedal control of said control valve device to control operative energization of the booster device to activate second stage movement of said work element, and thereby sensitizing the brake-applying operations under joint operator and booster control. Another object is to construct said actuator as a tubular bellows member with the added function of serving as a dust-excluding means for that portion of the control valve device which projects to the exterior of the booster power cylinder. Another object is to utilize said bellows member as a dust boot only thus eliminating its slack take up function for the latter to be performed under initial manual movement of the control valve device as a unit.

A modified feature is the novel interconnection of the pedal push-rod with the outer fluid-controlling element by interposition of the valve return spring whereby said actuator is effective to also move said push-rod and connected brake-pedal as a unit during lost-motion take up between the operating parts of the booster device so that minimal initial pedal movement would be required to activate the control valve device to applied position therefore controllably operating the booster device.

Another object is to provide variable pedal pressures from light to hard in accordance with drive choice by substituting in the control valve device a corresponding spring load and modifying the reaction produced by the reactive and return spring effective in one direction to bias both the servo-power piston and inner fluid-controlling element toward their respective normally released positions.

Another object related to the object next above is the provision of easy access to the booster output element and connected pressure plate without disassemblying the booster device, for removal of the output element and plate to enable installation of interchangeable plates defining different leverage ratios, respectively, with the aforesaid reaction-levers according to the division of work desired between the operator and booster device and thereby providing such range of pedal reactions from light to hard.

Another object is to provide a collapsible boot adapted to interconnect the inner end of the master cylinder push-rod adjacent the aforesaid pressure plate with the front end wall of the booster power cylinder for isolating atmospheric pressure from the constant negative (vacuum) pressure chamber in said power cylinder thus eliminating the usual flat gasket for sealing the mounting flange of the master cylinder airtight directly against the exterior of said end wall thus providing metal-to-metal contact to rigidly stabilize the master cylinder in operating position.

Another object is to provide improved and simplified means for interlocking the two shells comprising the booster power cylinder, said means also serving to anchor and seal the stationary peripheral margin of the flexible rolling-type power-diaphragm between the interlocked portions of said shells as well as facilitating assembly and disassembly of the power cylinder for servicing the internal components of said booster device.

An object related to the object immediately preceding is to produce said interlocking means in the form of a plurality of tabs extruded from the marginal portion defining the open end of one shell into a like-number of openings provided adjacently the open end of the other shell, said tabs being forced radially inwardly into said openings in contact with the confronting wall thereof to interlock said shells in an airtight assembly.

A modified feature related to the object next above is the utilization of a plurality of detachable spring clips in lieu of the aforesaid extruded tabs, and which are forced radially outwardly to accommodate telescopic assembly of the marginal portions adjacent the open ends of said shells, and which move radially inwardly to engage said openings automatically to effect said assembly of the shells.

And, a still further object is to provide novel cooperative modified relationships of the springs in said booster device whereby in one of said modified relationships, the reactive and return spring of the main embodiment serves only to bias the servo-power piston toward normal relaxed position in cooperation with a separate spring for biasing the air-valve element toward seated (closed) position; another modified relationship is produced by novel interposition of the valve return spring with respect to the outer fluid-controlling element and pedal operated push-rod in cooperation with either the aforesaid reactive and return spring of the main embodiment or negating such reactive function of the latter spring on the inner fluid-controlling element in favor of a separate spring to perform the latter function, thus enabling the reactive and return spring to serve as a means for returning the servo-power piston to its normal relaxed position; and, still another modified relationship results from connecting the pedal operated push-rod to the inner fluid-controlling element as by means of an interposed resilient grommet (O-ring) in cooperation with either said reactive and return spring or a separate spring reacting on said inner fluid-controlling element to bias the same toward normal engagement with the outer fluid-controlling element and upon such engagement both of said elements move as a unit toward normal relaxed position whereby said control valve device is positioned in unapplied condition.

The invention consists of the novel constructions, arrangements and devices hereinafter described and claimed for achieving the above-stated objects and such other objects and advantages as will appear from the following detailed disclosure of preferred embodiments illustrated by the accompanying drawing in which:

FIGURE 1 is a schematic representation of an automotive hydraulic brake system incorporating a booster mechanism (device) embodying the present invention, the vehicle brakes and device being shown in normal relaxed disposition;

FIGURE 2 is a rear elevation of the booster device per se shown in FIGURE 1, and particularly showing the reinforcing rib pattern and four threaded mounting studs for supporting said device in operating position on the vehicle firewall in the engine compartment.

FIGURE 3 is a longitudinal-vertical sectional view of the booster device per se as shown in FIGURE 1, and taken on an enlarged scale for clarification of the details;

FIGURE 3A is a fragmentary view of FIGURE 3 on an enlarged scale to clarify the details of the novel locking tab structure;

FIGURE 4 is a transverse sectional view partly in elevation and taken on an enlarged scale along the line 4—4 of FIGURE 3, of the three-lever force and reaction-transmitting mechanism;

FIGURE 5 is a view of the movable pressure plate per se shown in FIGURE 4 and which is operably related with the reaction-levers and output element;

FIGURE 6 is a view of the movable spring and pressure member per se shown in FIGURE 4 and which is operably related with the reactive and return spring for the booster piston assembly and inner fluid-controlling valve element;

FIGURE 7 is a view of the fastening means (locking tabs) for effecting unitary airtight assembly of the two power-cylinder shells and the interposed peripheral portion of the flexible power-diaphragm, said view being taken from the line 7—7 of FIGURE 3 on an enlarged scale;

FIGURE 8 is an end view partly in section of FIGURE 7 taken from the line 8—8 thereof to show the entrance through which a wedge-like tool may be inserted to force the locking tabs outwardly to disconnect the power-cylinder shells for disassembly thereof;

FIGURE 9 is a transverse sectional view taken along the line 9—9 of FIGURE 3, and showing on an enlarged scale the complemental arcuate sockets, and engaging tabs extruded from the truncated extension of said inner fluid-controlling valve element to interlock the former with the latter for unitary axial movement;

FIGURE 10 is a fragmentary view of FIGURE 3 on an enlarged scale showing an operated status of the booster device in which the booster power cylinder is charged with balanced negative (vacuum) pressure at opposite sides of the servo-power piston to effect automatic slack take up between the operating parts as indicated by the dashed line position of the control valve device, the solid line position of the latter demonstrates a different operated status wherein the vacuum-valve is closed under initial manual actuation upon completion of the aforesaid slack take up operation;

FIGURE 11 is a view similar to FIGURE 10 but showing a still different operated status demonstrating open (unseated) condition of the inner fluid-controlling element under additional manual actuation to create a pressure differential in the booster power cylinder at opposite sides of the servo-power piston to enable operatively controlled energization of the latter for power-assisting a brake-applying operation under joint control of the operator and booster device;

FIGURES 12 depicts a modified arrangement of the reactive and return spring adapted to serve the latter function only for the booster power-piston, and wherein an additional spring reacts between said power-piston and the inner fluid-controlling element to bias the latter toward closed (seated) position with respect to the outer fluid-controlling element;

FIGURE 13 illustrates a modified form of sealing means between the central opening in the end wall of the front power cylinder shell and the constant negative (vacuum) pressure chamber therein, said means being in the form of a tubular bellows member with its interior in continuous conumication with the atmosphere;

FIGURE 14 depicts a modified form of the control valve device wherein the annular resilient seat for the outer fluid-controlling element is carried by the booster power-piston, and the return spring for the pair of telescopically-related fluid-controlling elements is operably disposed between the manual input element (pedal pushrod) and the outer fluid-controlling element;

FIGURE 15 is a transverse view partly in section and taken on the line 15—15 of FIGURE 14 to show details of the taper-headed resilient projections for stabilizing the aforesaid annular resilient seat on the booster power-piston;

FIGURE 16 is another modification of the control valve device shown in FIGURE 14, and wherein the manual input element is connected to the inner fluid-controlling element for two-directional movement as a unit and accommodating universal movement therebetween, thus enabling said valve return spring to bias said inner fluid-controlling element toward seated engagement with said outer fluid-controlling element to close the "air-valve";

FIGURE 17 is a view similar to FIGURE 7 and illustrates an modified form of the fastening means for interlocking the two booster cylinder shells and outer looped portion of the flexible power-diaphragm in airtight unitary assembly, said means comprising a plurality of detachable spring clips in lieu of the extruded locking tabs in the main embodiment;

FIGURE 18 is a sectional view taken on the line 18—18 of FIGURE 17 showing details of the spring clip and related cylinder structure;

FIGURE 19 is a longitudinal section partly in elevation showing a modified form of the control valve device wherein the valve return spring is adapted to react between the outer fluid-controlling element and an adjustable spring seat member carried by the inner fluid-controlling element; and FIGURE 20 is a transverse sectional view taken along the line 20—20 of FIGURE 19 showing the ported spring seat member and reduced hex-profiled extension for applying a wrench to manually rotate said member to effect axial adjustment thereof.

Like characters of reference in the several views designate similar or corresponding components or parts.

As shown in FIGURE 1, a power-brake system incorporating the present invention includes my novel and improved pressure differential booster mechanism (device) generally designated "BD" and which is provided with a work-performing output element (push-rod) 7 which operatively projects into the master brake cylinder designated "MC." The chamber-defining body "BO" of the master cylinder is mounted on the front end wall 8 of the booster housing (power cylinder) "BC," the latter being mounted in a well known manner on a laterally flanged reinforcing plate 9 juxtaposed with respect to the engine side of the vehicle firewall "FW" under control of an operator-operated member disclosed herein as the usual suspended-type brake-pedal "PB" pivotally mounted at its upper end on a bracket "BR" projecting from the opposite side of said firewall into the driver's compartment of the associated motor vehicle and the like. A plurality (preferably four) of threaded studs 10 provided with heads projects through a like-plurality of holes in the rear end wall 11 of the booster cylinder BC and a matching pattern of holes through the aforesaid reinforcing plate and firewall, and lastly through a pair of opposing outturned flanges 12 contiguous to the drive side of said firewall for rigidly supporting the booster device BD in operating position as shown in FIGURE 1 under a a pair of spaced nuts 13 tightly threaded onto each of said stubs as shown. The aforesaid pedal BP is connected directly to a portion of a novel and improved control valve mechanism (device) designated "CV" for operatively controlling energization and de-energization of the booster device BD by means of a manual input element disclosed herein as a push-rod 14 pivotally connected at 15 to an intermediate portion of the pedal shank as shown.

Referring to FIGURE 1, the master brake cylinder MC is representative of the type commercially used on present-day motor vehicles to actuate the hydraulic brake system and, therefore, a detailed description of its structure and operation is unnecessary for a complete understanding of the present invention. The master cylinder MC includes the aforesaid chamber-defining body BO, a longitudinal bore 16 slidably receiving a piston 17 having a coaxial socket 18, which is effective when moved from normal position to pressurize the brake-fluid and displace the same through lines 19 to the brake actuators (wheel cylinders) "WC," and a normally compressed spring 20 is adapted to react on said piston to normalize the same. A fluid supply reservoir "R" is incorporated in the cylinder body in superposition to the bore 16 for gravitational feed to the latter and also serves to maintain the hydraulic system filled by way of the usual intake and compensating ports 21, 22, respectively, the brake-fluid in the reservoir and surrounding the piston 17 is maintained at atmospheric pressure by means of a vent 23 in the filler cap 24 as is understood.

The booster device BD also referred to as a "servomotor" or "motor" for flexibility in claiming terminology, comprises; the aforesaid booster cylinder BC formed of separable cup-like members (shells) 25, 26, the bottom of the former defining the aforesaid front end wall 8, and the bottom of the latter defining the aforesaid rear end wall 11. The two shells are held in airtight assembled relationship by means of a plurality of circumferentially spaced locking tabs 27 (preferably six) which is extruded from the flat top walls 28 of a corresponding plurality of rectangular embossments 29, respectively, formed in the peripheral margin of the open end of a flanged wall 31 normal to said bottom of shell 26, said embossments defining a like-plurality of longitudinal blind cavities which is coextensive with a like-plurality of blind slots 32 extending through an annular shouldered bead 33 and adjacent portion of the normal wall defining the peripheral margin of an annular flexible power-diaphragm generally designated "PD." The aforesaid locking tabs are adapted for forcible projection radially inward through the blind end portions 34, 35 of said cavities and slots, respectively, into engagement with cooperating working edges 36 defining a like-plurality of rectangular openings 37, respectively, formed in a cylindrical wall (flange) 38 adjacent the open end portion of the front shell 25, and normally disposed with respect to the end wall 8 as shown in FIGURES 1, 3 and 7.

The common entrance to the aforesaid cavities and slots enables insertion of a suitable wedging tool against the underside of said locking tabs to force them radially outwardly to disengage them from their repsective working edges 36 and thereby effecting disconnection of said pair of cup-like members 25, 26 for disassembly thereof.

Interfitting the interior of the aforesaid rear shell 26 is a substantially complemental cup-like member (stamping) 38 having a centrally apertured bottom wall 40 juxtaposed with respect to the inner face of the said rear end wall 11, the marginal portion defining said aperture being provided with a pattern of holes matching the arrangement of the mounting studs 10 aforesaid to capture the wall 40 and impinge the same against the end wall 11 under one of said pair of securing nuts 13 as best shown in FIGURE 3. The outer periphery of the wall 40 is characterized by a terminal cylindrical wall (flange) 41 normal thereto and in circularly spaced relation to the open end portion of the flange 38 on the front shell 25. The extremity 42 of each tab 27 when forced into locking position as shown in FIGURE 7, engages the aforesaid cooperating working edges 36 and thereby connecting the two cylinder shells 25, 26 in a unitary airtight assembly, that is, projection of the locking tabs into their respective cooperating openings 37 is effective to lock the two cylinder shells against relative longitudinal and rotary displacement. It is important to note that the opposing lateral edges 44, 45 of the locking tabs 27 engage confronting lateral edges 46, 47, respectively, of the aforesaid openings 37 to prohibit relative fortuitous displacement between said cylinder shells thus stabilizing them as a unit (see FIGURES 7 and 8).

The aforesaid mounting studs 10 also project through a pattern of matching holes 48 formed in the bottom wall 40 of the interfitting stamping 39 whereby the heads 49 of these studs capture the stamping 39 under the aforesaid securing nuts 13 to impinge said stamping and rear shell 26 in a rigid coaxial unitary assembly best demonstrated in FIGURES 1, 3 and 3A.

The booster cylinder BC is divided into a constant negative (vacuum) pressure chamber 51 and a variable pressure (air-vacuum) chamber 52 by means of a movable wall means disclosed herein as a power-member or piston assembly generally designated "PP" and which operably supports the aforesaid rolling-type power-diaphragm PD in part.

A check-valve device generally designated "CK" of commercial design is mounted on the front end wall 8 of the booster cylinder BC as shown and is operative to open whenever pressure in the booster chamber 51 is higher than the pressure from a vacuum source such as the intake-manifold "IM" of an internal combustion engine (see FIGURE 1). An external tubular stem 53 having an external circularly serrated surface portion 54 continuously communicates with the intake-manifold IM via a line (conduit) 55, said stem terminating at its opposite end in a cup-shaped housing 56 and is provided with a reduced externally threaded portion 57 which produces an annular shoulder 58 therebetween and provided with a complemental annular gasket 59, the reduced portion projects through a hole 60 in the aforesaid end wall to dispose the gasket under compressive sealing relation to the marginal portion of said hole, said housing defining an interior chamber containing an annular resilient valve element 61 preferably composed of molded rubber formed with a central embossment 62 which projects into a complemental coaxial recess 64 formed in a mounting cap 65 of cup-like configuration which is tightly threaded onto the reduced threaded portion of the aforesaid housing to impinge the latter in airtight sealing relation to the end wall 8 as shown. This cap includes a plurality of air-vacuum passages 66 through the bottom wall 67 thereof, and a truncated stamping 68 having a flanged base 69 has interpositioned with respect to the opposite side of said embossment 62 and end wall 70 of the aforesaid housing chamber to stabilize the valve element 61 in operating position with respect to a plurality of passages 66, said stamping 68 being provided with a plurality of passages 71 through the conical wall thereof for maintaining communication between said stem 53 and valve element 61 as shown. Accordingly, air from chamber 51 is evacuated under vacuum pressure created in said intake-manifold IM through the passages 66, 71 by pressure differential acting on said valve element 61. Should the vacuum source fail due to leakage or when the engine stops, the valve element 61 will seat, that is, close the passages 66 due to its inherent restorative characteristic to assume normal contact with the bottom of the mounting cap under atmospheric pressure within the housing chamber 51, such trapped vacuum pressure being available for at least four to five power-actuations of the booster device BD after the vacuum source has been lost.

The aforesaid movable piston assembly PP comprises: a cup-shaped wall or member 73 which supports the major portion of the wall 74 of the aforesaid flexible rolling-type diaphragm PD as shown in FIGURE 3, said piston member 73 having a plate 75 normal to the axial of the booster device BD, with its outer periphery defining a horizontal forwardly extending wall (flange) 76 normal to said plate, a cup-shaped embossment 77 extruded forwardly from the central portion of said plate is characterized by an inturned annular flange 78 spaced forwardly of said plate by an interconnecting cylindrical wall 79, the inner periphery of the flange 78 terminating in an annular bearing flange 81 as shown. A pair of diametrically-opposed vacuum-ports 82 is provided in the flange 78. A cylindrically walled sleeve-type member 83 having an enlarged diameter portion 84 is adapted to exteriorly telescope the aforesaid embossment wall 79, and which terminates in an outstanding annular flange 85 contiguously disposed to the confronting portion on the left side of the piston plate 75 and moves as a unit therewith in coaxial relation thereto. A plurality (preferably three) of equally spaced transversely disposed rectangular openings 86 is formed through the forward normal diameter wall of said sleeve-type member 83, said openings having the curvature of the right working edge (side) flatted for an important purpose to appear. Another member (plate) 88 is centrally juxtaposed on the confronting right side portion of said piston plate 75 opposite said embossment 77 to define an annular valve housing or cage designated "VC," said plate having an annular outstanding flange 89 having at least two air-vacuum ports 91, and the outer peripheral portion is formed as a lateral channel 92 for reception of a complemental annular bead 93 defining the inner periphery of said diaphragm wall 74. The inner peripheral margin of said outstanding flange 89 terminates in a rearwardly offset cylindrical segment 94 and an annular inturned vertical flange 95 which defines a central circular opening 96 normal to said offset segment. The flanges 85, 89 and the centrally interposed portion of the piston plate 75 produce a unitary assembly by means of a plurality of equally spaced bolts 97 which pass through a complemental pattern of holes in said flanges and plate and which are provided with self-locking nuts 98, thus the latter flanges and piston plate 75 are captured between the bolt heads and nuts with the effect of subjecting the diaphragm bead 93 to compression in the channel 92 to effect an airtight sealed assembly thereof.

The outer peripheral margin of the diaphragm wall 74 is formed in S-cross section to produce a pair of parallelly spaced overlapping elongated loops 101, 102 defining the inner and outer loops, respectively, thereof. A pair of legs 103, 104 defines the inner loop, and a leg 105 with leg 104 common to both of said loops defines the outer loop. The inner loop has interposition with respect to the aforesaid circular space obtaining between the shell flanges 38, 41, and is characterized by "rolling-contact" with the cylindrical confronting surfaces on the latter flanges while the outer loop embraces the corresponding length of the cylinder wall 38 adjacent the open end of the front shell 25 and overlies such wall length contiguously to the outer cylindrical surface thereof and is confined between the flange 31 and corresponding portion of the cylinder wall 38 as shown. The outer peripheral end of the aforesaid diaphragm wall 74 terminates in the annular bead 33 aforesaid which abuts the confronting end of the flange 31 to stabilize the outer loop with respect to the latter flange. Accordingly, it is seen that the assembled status of the front and rear cylinder shells 25, 26, respectively, and the interfitting cup-like stamping 39 as shown in FIGURE 3, that the flanges 31, 41 produce with the interposed cylinder wall portion 38 defining the open end of the front shell 25, a pair of parallelly disposed overlapping annular spaces 107, 108, respectively, adapted to receive the aforesaid inner and outer loops 101, 102, respectively, and that upon assembling the diaphragm loops and the two cylinder shells 25, 26 and stamping 39, these three cylinder components are locked in airtight assembly by means of the aforesaid locking tabs and cooperating working edges of the openings 37 as shown in FIGURE 7.

A circular opening 109 is provided through the central portion of the end wall 11, and through which a valve support bushing 110 projects rearward to the exterior of said end wall. This bushing is formed at its inner end as an outstanding annular flange 111 which normally abuts the peripheral margin of the opening 109, and is fixed to said end wall 11 as by welding or otherwise. The aforesaid flange 95 is adapted to abut the bushing flange 111 to establish the piston assembly PP in its normal relaxed "power-off" position shown in FIGURE 3. A circular embossment 112 in V-shaped cross section is formed in the bottom wall 40 of the stamping 39 for stiffness and to provide supplemental stop means for the piston assembly PP by engagement with a confronting surface portion on the diaphragm wall 74 of the apex 113 of said embossment as shown. Thus, the apex 113 and flange 111 when simultaneously engaging the diaphragm wall 74 and flange 95, respectively, serve to define the "power-off" disposition of the piston assembly PP wherein the vehicle brakes are released (off). The aforesaid opening 109 is defined by a circular outturned hub-like flange 114 having a terminal angular lip 115 producing an annular channel 116 which receives the forward complemental bead 117 of an accordion-type bellows member designated "BM" and functions as a pressure differential actuator to take up the slack in the operating parts preliminary to pedal control thereof, and also to serve as a dust-excluding and sealing means for the opening 109 in the end wall 11 therefore for the variable pressure chamber 52 in the booster power cylinder BC, said bellows member BM being of tubular configuration with the interior thereof defining an annular variable pressure chamber 118 which communicates continuously with said chamber 52 by means of a surface channel 119 formed in the bushing 110 as shown.

Reference is now made to my novel and improved poppet-type control valve mechanism (device) of simplified construction and more efficient operation and which comprises: an outer and an inner telescopically-related fluid-controlling element generally designated "OE" and "IE," respectively, and which are arranged in coaxial overlapping (interfitting) relationship to the axis of the booster device BD. The outer control element OE is formed as a bell-shaped outstanding flange 121 from which extends an elongated tubular valve sleeve 122 which slidably projects rearward through the aforesaid opening 96 and support bushing 110 to the exterior of the rear end wall 11 of the booster cylinder BC. The bell-shaped flange 121 is provided with an annular groove 123 in the forward face thereof and which is characterized by a pair of radially spaced diverging annular faces for reception of the base portion of an annular valve element 124 made of resilient material such as molded rubber, the exterior portion of said valve element being formed with a terminal curving valve face 125 which is normally separated (spaced) from a complemental confronting surface portion on the aforesaid flange 78 defining an annular valve seat 126, said valve face and seat in the broader patent sense defining a pair of fluid-controlling portions which produce what may be termed a "'vacuum-valve" designated "VV." The aforesaid space obtaining between said valve face and seat when fully separated is defined by the opposite (rear) side of the valve flange 121 engaging the inner side of the aforesaid inturned flange 95 of the valve cage VC, and in the wide open position of said vacuum-valve VV as shown in FIGURE 3, both of the booster cylinder chambers 51, 52 are under balanced negative (vacuum) pressure via air-vacuum ports 91, the space between said valve face and seat 125, 126, respectively, and vacuum-ports 82, therefore the present booster device BD is commonly known in the industry as the "vacuum-suspended type" when the working parts thereof are in their respective normal released positions wherein the vehicle brakes are fully released.

The central portion of the valve flange 121 comprises an annular hub-like portion 127 provided with an internal annular groove 128 fitted with a complemental packing (O-ring) 129. Adjacent the outer end of said valve sleeve 122 is an external annular groove 131 formed with an outwardly tapering bottom which receives a complemental annular flange 133 from which projects an outstanding angulated annular member 134 having an arcuate looped flange 135 defining the outer periphery thereof. Spaced rearward of the aforesaid groove 131 is another annular groove 136. The wall of the first fold of the bellows member BM is disposed contiguously to the outer face of the aforesaid member 134 to support said fold wall to prevent radial collapse inwardly thereof, and the inner periphery of said first fold defines an annular sleeve 137 having an annular internal bead 138 in arcuate cross section which engages the outer groove 136 aforesaid in airtight sealed relation. Circularly aligned with the last-defined annular bead is an external annular groove 139 formed in said sleeve 137 for reception of a split contractible retaining ring 140 to stabilize the aforesaid bead 138 in the groove 136. The interiors of the outer vertexes 141 of the bellows member BM are fitted with circular metallic rings 142 to prevent inward radial collapse of the bellows member folds when under a pressure differential. Since the interior of the bellows member BM produces the aforesaid annular vacuum-air (variable) pressure chamber 118 with the circularly aligned portion of the exterior of said valve sleeve 122, and which is subjected to negative (vacuum) pressure from chamber 52 via channel 119 indented in the inner cylindrical surface of the support bushing 110, it follows that when the bellows member is under a pressure differential at opposite sides thereof it tends to collapse radially inwardly and the outer looped end wall 138 thereof is urged forwardly to effect limited initial forward movement of the valve flange and sleeve 121, 122, respectively, sufficient to partially close the vacuum-valve VV aforesaid with consequent taking up of the slack between the control valve device CV and mechanically associated parts connecting the latter to the fluid column in the brake system to pressurize the fluid therein under said master brake cylinder MC since the piston 17 of the latter is also moved to close the compensating port 22 aforesaid in opposition to the return spring 20, such backlash (slack) being normally effective between the booster working parts and between the master cylinder piston 17 and wheel cylinder pistons prior to applying the vehicle brakes and the engine turned "off." It is thus seen that the above-described automatic take up of the slack in the booster device BD and brake system produces a sensitized "touch" pedal-actuation of the control valve device CV to operatively control energization of the power-piston PP under minimal pedal movement as will appear. The aforedescribed pressure differential energization of the outer fluid-controlling element OE prior to effective pedal control thereof, reduces pedal operation to what is termed in the Industry as a "touch-pedal" as distinguished from "pedal movement" conducive to a more predictable braking control as well as accommodating a corresponding reduction in the amount of operator force required to apply the vehicle brakes in the event of partial or total failure of the booster device BD to operate. Moreover, with the valve flange and sleeve 121, 122, respectively, under such pressure differential, substantially all lost-motion (slack) is removed from the brake-pedal hook-up to the booster control valve device CV and operative connections of the latter to the master cylinder piston 17 with closure of the compensating port 22 being effected to enable the fluid in the brake lines to be placed under limited pressure preliminary to augmenting such pressure to apply the brakes under joint influence of operator and booster forces. It is thus seen that upon slack take up in the manner described above, only a "touch" of the brake-pedal BP is required to inaugurate booster assist to provide instant power-braking. A pair of diametrically-opposed air-ports 143 is provided through the wall of the valve sleeve 122 adjacent the right side of the aforesaid hub-like portion 127, and an integral annular partition wall 144 is provided intermediately of the interior of said valve sleeve 122 to produce an inner and an outer opposing air chamber 145, 146, respectively, with their outer ends open as shown in FIGURE 3, said partition wall defining a central circular opening 147 with its medial surface portion provided with an internal annular groove 148 in arcuate cross section.

Slidably interfitting the inner air chamber 145 in part is the aforesaid inner fluid-controlling element IE disclosed herein as a cylindrical air-valve element 151 projecting forwardly through said hub-like portion 127 and O-ring seal 129 and the aforesaid bearing flange 81 whereby the power-piston PP is slidably supported on the forward portion of the air-valve element 151 to maintain the power-piston PP in a rectilinear path of movement thus preventing any tendency of axial disalignment between the aforesaid control valve device CV and booster cylinder BC as is understood. The forward end of the aforesaid air-valve element 151 terminates in an elongated reduced extension 152. An annular shoulder 153 defines the juncture of said extension and said air-valve element, the latter being provided with a truncated socket 154 merging rearward into a conically diverging wall terminating in a rounded annular valve face 155 adjacent the periphery of said air-valve element, said rearward portion of said socket defining a truncated air chamber designated "AC" which is controllable at its valve face defining end by means of an annular valve member 156 in L-shaped cross section having an annular vertical flange 157 defining a valve seat 158 and a horizontal tubular portion 159 normal to said vertical flange, said tubular portion having an exterior annular bead 160 engageable with the aforesaid groove 148 in the partition wall opening 147 to stabilize the valve flange 157 against the left side of said partition wall 144 as shown. A circular opening 161 through said tubular portion is effective to maintain atmospheric communication between the aforesaid air chamber AC and outer air chamber 146 in the valve sleeve 122, said last-defined valve face and seat define a pair of cooperating fluid-controlling portions which in the broader patent sense produce what may be termed an "air-valve" designated "AV." A coaxial extension projects rearward from said air-valve element 151 which is disclosed herein as a hollow truncated member 163 having its smaller end 164 closed and its outer open end defined by an annular outstanding flange 165. The inner closed end portion of member 163 complemental to the aforesaid socket 154 and thus nests therein. A pair of diametrically-opposed resilient locking tabs 166 is extruded outwardly from the conical wall of said closed end portion 164, said tabs being adapted to engage arcuate recesses 167 (see FIGURE 9) which define end wall shoulders 168, respectively, at the rear ends thereof, the latter shoulders being engageable by the feed ends 169 of said tabs 166 to connect the truncated member 163 and air-valve element 151 to have axial unitary movement. In the event it is desired to disconnect the truncated member 163 from the air-valve element 151 to enable servicing the control valve device CV, manual rotation of the truncated member relative to the air-valve element 151 would engage the arcuate extremes of the recesses 167 with the lateral edges of said tabs 166 depending on the direction of relative rotation, to force the tabs 166 inwardly out of engagement with the shoulders 168 to effect disconnection thereof thus freeing the truncated member for removal through the outer air chamber 146. The truncated member 163 projects rearward through the aforesaid opening 161 into the outer air chamber 146 with its outstanding flange 165 spaced from the right side of the aforesaid partition wall 144 as shown in FIGURE 3. A pair of air-ports 171 is provided through the conical wall of the truncated member adjacent the flange 165 on the latter to maintain communication between the interior and exterior of the truncated member 163 positioned in said outer air chamber 146.

The free rounded end of the aforesaid push-rod 14 projects into the hollow of said truncated member into engagement with the closed end 164 thereof, the outer end of said push-rod being pivotally connected to the pedal shank best shown in FIGURE 1. Operation of the brake-pedal BP is effective to actuate the air-valve element 151 initially as a unit with the outer valve flange and sleeve 121, 122, respectively, and relatively to the latter to disengage and engage the valve face 155 with respect to the valve seat 158 and thereby admitting atmospheric pressure from the air chamber AC past the unseated valve face and seat 155, 158, respectively, via longitudinal surface channels 172 and communicating annular surface channel 173 characterizing the rear portion of the outer cylindrical surface of said air-valve element 151, said channels being in continuous communication with the aforesaid pair of diametrically-opposed air-ports 143 through the valve sleeve 122 adjacent the right side of said flange hub-like portion 127. It is thus seen that the air-valve AV controls ingress of atmospheric pressure from the air chamber AC as shown in FIGURE 11 to create a pressure differential in the booster chambers 51, 52 to activate the power-piston PP and thereby providing power-assist for the operator (vehicle driver) in applying the vehicle brakes, such air control being effective to produce said pressure differential upon seating (closing) of the vacuum-valve VV as shown in the last-mentioned figure.

A normally compressed valve spring 174 is operatively positioned in the outer air chamber 146 between the aforesaid flange 165 on the truncated member 163, and the confronting right side of the partition wall 144, to bias the said pair of fluid-controlling elements OE and IE toward each other to engage the valve face and seat 155, 158, respectively, and thereby closing the air-valve AV as shown in FIGURES 3 and 10, said last-defined spring having a normal rate of compressive deflection capable of transmitting sufficient thrust without deflecting to enable movement of the control valve device CV as a unit to engage the aforesaid valve face 125 with its complemental seat 126 to close the vacuum-valve VV whereupon additional operator force exerted on the pedal BP is effective through the push-rod 14 to move the air-valve element 151 relatively to the valve flange 121 and sleeve 122 to disengage the valve face and seat 155, 158 and thereby opening the air-valve AV to produce a pressure differential at opposite sides of the power-piston PP for power-assist in operating the vehicle brakes as is understood.

An internal annular grove 175 is formed adjacent the open end of the aforesaid outer air chamber 146, and which is fitted with a split retaining ring 176 spaced rearward of the aforesaid flange 165. This retaining ring is adapted to stabilize a cup-shaped member 177 having a circular opening 178 through the bottom wall 179 and its cylindrical wall 180 normal to said bottom wall and projecting forwardly to encircle the aforesaid flange 165. The space normally obtaining between said ring and flange is filled with an annular sponge-like air filtering element 181 as shown. This filtering element is under deformation when the fluid-controlling elements OE and IE are in normal relaxed position as shown in FIGURE 3, and expands in accordance with axial enlargement of said space in response to relative movement of the fluid-controlling element IE with respect to the fluid-controlling element OE without negating the filtering function of said element 181. The aforesaid pedal push-rod 14 slidably projects loosely through the opening 178 and filtering element into the hollow of the aforesaid truncated member 163 to actuate the control valve device CV in the manner previously described. Atmospheric pressure enters the aforesaid opening 178 and passes through the filtering element into the hollow of said truncated member 163 and thence through the pair of air-ports 171, outer air chamber external to said truncated member, opening 161, inner air chamber 145, air chamber AC for control under said air-valve AV as shown in FIGURES 3, 10, and 11.

Attention is now directed to the three-lever force and reaction-transmitting mechanism (device) generally designated "RD" which is operatively related with the aforesaid booster work-performing (output) element 7 and the inner fluid-controlling element IE as best shown in FIGURES 4, 5, and 6, and with particular reference to FIGURE 4, it will be noted that the forward adjustable end 183 of the output element is adapted to enter the socket in the master cylinder piston 17 into engagement with the bottom thereof to actuate said piston to pressurize the brake-fluid for a brake-applying operation as is understood, and the opposite end of said output element 7 is provided with a coaxial blind bore 184 which slidably receives the aforesaid reduced extension 152 projecting coaxially from the forward end of the aforesaid air-valve element 151. Movement of the air-valve element 151 and the power-piston PP is transmitted to the output element (push-rod) 7 through a mechanical connection provided by a lever assembly generally designated by the reference characer "LA." The lever assembly comprises: a plurality of radially-disposed levers 185 (preferably three) in equally spaced circumferential relation with the outer reduced end portions confined in the aforesaid three rectangular openings 86, respectively in the sleeve-type member 83, their inner end portions which are similarly reduced, being confined in correspondingly shaped rectangular openings 186 formed in three circumferentially equally spaced horizontal flanges 187 extruded out of the central portion of a cup-shaped movable spring seat member (stamping) 188 of annular configuration (see FIGURE 6). This seat member has a central hole 189 through which said reduced extension 152 passes to support said member in coaxial relation to the air-valve element 151, and the marginal portion defining said hole 189 continuously engages the aforesaid shoulder 153 for unitary axial movement of the seat member and air-valve element 151. The peripheral marginal portion of said spring seat member is processed with three rectangular cutouts 191 in equally spaced circumferential relation as shown in the last-mentioned figure, said cutouts intersecting an outstanding annular flange 192 normal to the axis of the booster device BD, and an angular segment 193 merging into a vertical segment 194 out of which the aforesaid flanges 187 are extruded as shown. A dish-shaped pressure member (stamping) 195 having a central hole 196 through which said extension 152 passes to support the same, is adapted to continuously engage the inner end of the aforesaid output element (push-rod) 7, the outer periphery of said member 195 being defined by three radially outstanding pressure-applying elements 197 which project into the aforesaid cutouts 191, respectively, into fulcrum engagement with intermediate portions on the aforesaid levers 185 as shown. It will be noted that the periphery of the spring seat member 188 loosely interfits the forward normal diameter portion of the sleeve-type member 83. A normally compressed reactive and return spring 198 is adapted to react at its opposite ends on the forward peripheral marginal portion of the spring seat flange 192 and confronting shoulder 199, respectively, formed by an annular offset flange 201 defining a central opening 202 in the end wall 8 of the booster front shell 25. It should be importantly noted that the rear end coil of the aforesaid spring 198 nests within the forward normal diameter portion of the aforesaid sleeve-type member 83 in contact with the peripheral marginal portion of the spring seat flange 192. It is thus seen that the sleeve-type member 83 and flange 201 on the power cylinder shell 25 cooperate in maintaining the coils of the spring 198 in correct working alignment for progressively increasing reactive forces throughout the full working stroke of said output element 7 in a power-assist direction.

The aforesaid reaction-levers 185 are each formed with reduced width portions 203 defining opposite extremes (ends) thereof which produce a pair of oppositely disposed shoulders 204 with the normal body width 205. The outer and inner reduced portions project into their respective rectangular openings 86, 186, with the two pairs of oppositely disposed shoulders 204 of each lever spanning the radial space obtaining between the interior of said member 83 and the exterior of said flanges 187 for each lever to fit loosely therebetween for rocking movement. Therefore, the two pairs of shoulders 204 on each lever are effective to stabilize the latter against fortuitous radial displacement or disalignment out of operating position shown in FIGURES 3 and 4. It is further important to observe in connection with the aforesaid pivotal connections of each lever, that the inner edges of the right walls of the openings 86, 186 are effective as working line-contacts with the confronting surfaces on the outer reduced width portions of said levers in normal tilting position as shown in FIGURE 3 until the levers reach a substantially vertical position as demonstrated by FIGURE 10, and, similarly, the outer edges of the right walls of said openings define working line-contacts with the confronting surfaces on the inner reduced width portions of said levers to maintain the leverage ratio constant during rocking movement of the levers as a function of manual actuation of the control valve device CV to control operative energization of the booster device BD for power-assist. It is thus seen that during rocking movement of the levers 185 from FIGURE 3 to FIGURE 11 position that the pivotal contact line between the reduced width extremes of said levers changes from the inner to the outer edges of the right walls defining said openings thus radially shifting outwardly the width of said opening walls to maintain working line-contact with said levers during booster braking assist. The inner edges of said opening walls are effective as working line-contacts with said levers during automatic slack take up previously described, and closure of the vacuum-valve VV as demonstrated by dashed lines and solid lines, respectively, in FIGURE 10. Since the pivotal line-contact of the pressure-applying elements 197 on the pressure member 195 with the intermediate portions of said levers 185 does not change during the aforedescribed transition of the pivotal line-contacts of the extremes of said levers with the inner and outer working edges of the aforesaid openings 86, 186, the leverage ratio correspondingly changes during the automatic shift of the pivotal point of the levers from the inner to the outer edges of said openings, but upon the control valve device reaching the operating status shown in FIGURE 10, actuation of the latter to applied position under manual control is effective to tilt the levers 185 out of vertical position shown in FIGURE 10, to the tilted position of FIGURE 11 to render the outer edges of said openings effective as pivotal points during booster-assist in applying the vehicle brakes and the leverage ratio during such booster-assist remains constant to provide proportional reaction on the brake-pedal BP as is understood.

It is therefore seen that the reaction-lever assembly LA is effective to connect the power-piston PP, air-valve element 151 and booster output element 7 so that movement of any one of these parts results in positive movement of one or the other or both of the other parts to provide a proportional distribution of work between the booster device BD and operator, and the aforesaid leverage ratio may be modified at will to change the division of work between the operator and the booster device by substituting an interchangeable pressure member 195 provided with shorter or longer pressure-applying elements 197 according pedal sensitivity desired.

The aforesaid reactive and return spring 198 is normally effective to react on both the air-valve element 151 via said shoulder 153 and the power-piston PP via the connected sleeve-type member 83, to bias these two components toward their respective normal "power-off" positions shown in FIGURE 3, and when the power-piston PP is operatively energized as demonstrated by FIGURE 11, this spring 198 reacts on the air-valve element 151 only. Therefore, during a brake-applying operation the movable spring seat member 188 is displaced forwardly out of engagement with inturned flange 78 of the embossment 77 so that unrestricted movement of the power-piston PP insofar as the spring 198 is concerned, occurs in a brake-operating direction. It is thus seen that spring 198 reacts continuously on the air-valve element 151 and on the power-piston PP only during retraction of the latter toward their normal positions.

Further considering the operational behavior of the reactive and return spring 198, it is important to note that this spring when being released to bias the power-piston PP toward normal released position, transmit force via two paths, namely; (1) via the pressure and spring seat member 188, air-valve element 151 to seat the latter on the valve seat 158 thus urging the outer fluid-controlling element OE as a unit toward normal released position of the control valve device CV wherein the valve flange 121 is in engagement with the inturned flange 95 of the valve cage VC, and the power-piston PP toward its normal released position, and (2) the force applied to the reactive spring pressure and seat member 188 is effective to bias the latter into engagement with the inturned flange 78 of power-piston embossment 77 upon seating the air-valve element 151 as aforesaid with the control valve return spring 148 working in cooperation with spring 198 to restore the outer fluid-controlling element OE to its normal relative position with respect to the inner fluid-controlling element IE.

A resilient sealing member designated "SM" is operably associated with the aforesaid offset flange 201 and central opening 202 in the vertical portion of the front end wall 8 of the booster cylinder BC, said sealing member comprising a cup-shaped wall 206 preferably composed of molded rubber with its forward open end terminating in an outwardly flanged external groove 207 which receives the aforsaid offset flange 201, and an elongated body portion 208 projects rearward from said flange 207 and which is reinforced exteriorly by a plurality of longitudinal ribs 209 which interconnect a pair of spaced annular ribs 210, the rear end of said body portion terminates in an inturned annular flange 211 defining a ring-like sealing lip 212 provided with an external annular groove 213 adjacent the juncture of flange 211 and said sealing lip. Slidably projecting through said sealing lip is the aforesaid booster output element (push-rod) 7 in airtight sealed relation. An annular sleeve-like member 214 is formed with an intermediate cylindrical wall 215 which terminates at its forward and rear ends in an outstanding flange 216 and an inturned flange 217, respectively, normal to said wall 215, the latter flange being provided with a central opening 218 as shown and the marginal portion thereof being adapted to engage the groove 213 to axially stabilize the sealing lip around said output element 7. The member 214 is adapted to interfit the cup-shaped wall 206 to stabilize the latter both radially and longitudinally thus preventing fortuitous disconnection of the flanged groove 207, offset flange 201 and flange 216, the latter flange being effective to impinge the flanged groove 207 agains the offset flange 201 in airtight sealing relationship.

The outer face of the flange 216 is disposed flush with the outer face of the vertical portion of the front end wall 8 (see FIGURES 1 and 3). The master cylinder MC is provided with the usual mounting flange 219 having a finished face 220, and an annular hub 221 projects from said latter face into said sleeve-like member 214 as shown, to stabilize the master cylinder piston 17 in coaxial relation to the axis of the booster device BD thereforce the output element 7. A pair of cap screws (bolts) 222 projects through a matching pattern of diametrically-opposed holes in the end wall 8 and mounting flange 219 for rigidly mounting the master cylinder MC in metal-to-metal contact with the confronting outer face of said end wall 8. A pair of nuts 223 (see FIGURE 1) threaded on said bolts 222 draw the master cylinder mounting flange into a rigidly stabilized assembly with said booster cylinder BC.

Accordingly, this novel sealing means SM eliminates the sealing problem between the master cylinder MC and the constant negative pressure chamber 51 in the booster cylinder BC, and, in addition, this novel sealing feature contributes a rigid assembly effective to stabilize the installed operating clearance normally obtaining between the front adjustable end of the output element 7 and bottom of the socket in the master cylinder piston 17 to insure that said piston will not be held forwardly of its normal released position wherein fluid compensation via the compensating port 22 is effective, upon the booster device BD returning to its normal brake "off" position as shown in FIGURE 3, and, moreover, this sealing means prevent axial distortion when the booster device BD is under a pressure differential producing power-assist as is understood.

A surface passage 224 formed in the finished face 220 of the mounting flange 219 is adapted to intersect a longitudinal passage 225 formed in the outer surface of the hub 221 (see FIGURES 1 and 3) and thereby maintaining the interior of the support member 214 at atmospheric pressure which is isolated from the constant pressure chamber 51 in the booster cylinder BC by means of the aforesaid sealing lip 212.

FIGURE 12 illustrates a modified arrangement of the reactive and return spring 198 by adapting the right end thereof to react on an annular shoulder 226 produced by reducing the left end portion 227 of the aforesaid normal diameter portion of the sleeve-type member 83 movable as a unit with the power-piston member 73. A separate normally compressed spring 228 is employed between the inturned flange 78 of the power-piston embossment 77 and an annular shoulder 229 formed on the left end of the air-valve element 151 by a reduced cylindrical portion 230 to provide installation space for the last-defined spring, said portion 230 proejcting through the aforesaid bearing flange 81 of less diameter than shown in the main embodiment to slidably support the power-piston PP. The aforesaid spring 228 performs the function of biasing the air-valve element 151 into seated engagement with the valve seat 158 carried by the outer fluid-controlling element OE, to close the air-valve AV. Another annular shoulder 231 spaced forwardly from the shoulder 230 and which corresponds to the shoulder 153 of the main embodiment, defines the juncture of the reduced portion 230 and extension 152, said shoulder 231 being in continuous engagement with the aforesaid spring seat member 188 for axial movement as a unit and to perform the same functions previously described in connection with the main embodiment (FIGURES 1–11).

FIGURE 13 discloses a modified form of the sealing means SM between the opening 202 in the front end wall 8 of the booster shell 25 and constant negative pressure chamber 51. A tubular accordion-type bellows member 235 is adapted to replace the inturned annular flange 211 and ring-like sealing lip 212 of the main embodiment as shown in FIGURE 3. The bellows member 235 loosely interfits the aforesaid reactive and return spring 198 in encircling relation with respect to the booster output element 7. The rear end of the bellows member terminates in a tubular extension 236 characterized by radially inward tension around the confronting portion on said output element 7. An external annular groove 237 is formed in said output element for reception of a complemental annular bead 238 defining the medial portion of the inner surface of said extension 236, said bead and last-defined groove cooperate to effect an airtight seal of said extension 236 around said output element adjacent the pressure member 195, under compression by a split contractible re-retaining ring 239 engaging an external annular groove 240 formed in said tubular extension in circular alignment with the aforesaid bead and groove 237, and thereby augmenting the radially inward tension inherent in said resilient tubular extension to effect an airtight seal between the output element and therefore said opening 202 and said constant pressure chamber 51. The folds comprising said tubular body portion accommodate unrestricted reciprocable movements of said output element 7, and contribute the same novel advantages described in connection with the sealing means SM of the main embodiment.

FIGURES 14 and 15 illustrates a modified form of the booster device BD in which the forward open end of the cylindrical wall 180 of the aforesaid cup-shaped member 177 containing the air filtering element 181, is provided with a terminal outstanding flange 242 in engagement with the left side of the aforesaid retaining ring 176 of the main embodiment, and the left side of said flange 242 is normally in engagement with an annular plate disclosed herein as a commercial C-washer 243 carried by the manual input element (pedal push-rod) 14, said C-washer may be provided with a plurality of air ingress ports 244 as shown or otherwise formed to enable free passage of air from one side to the other, and which is adapted to engage an annular external groove 245 in said push-rod whereby the aforesaid valve spring 174 is operatively positioned between the right side of the aforesaid partition wall 144 and said C-washer to establish a predetermined spring load between the outer fluid-controlling element OE and said push-rod 14, said spring load accommodating movement of the push-rod 14, outer fluid-controlling element OE and inner valve element 151 as a unit to close the vacuum-valve VV whereupon additional actuation of said push-rod 14 to effective to force said spring to yield for relative movement of the air-valve element 151 with respect to the outer fluid-controlling element OE to open the air-valve AV for admission of atmospheric pressure into the variable air-vacuum chamber 52 via said ported C-washer, said outer air chamber 146 and open air-valve AV which creates a pressure differential at opposite sides of the aforesaid piston assembly PP to move the same in a power-assisting direction to operate the vehicle brakes in part. It should be noted that the rounded end of the push-rod 14 is slightly spaced normally from the bottom of the socket in the air-valve element 151 when the booster device BD is in relaxed disposition as shown in FIGURE 14 to enable the reactive and return spring 198 to close the air-valve AV by engaging the valve face 155 with the valve seat 158, therefore it is seen that a limited backlash must be present between the bottom of the aforesaid socket and push-rod 14, otherwise the push-rod would hold the air-valve AV forwardly off its seat thus preventing closure thereof under said spring 198.

Another novel feature provided by this modification is to form the peripheral margin of the aforesaid bearing flange 81 with a plurality (preferably six) of holes 246 to receive a like-plurality of projections 247 integrally projecting from the left side of a resilient annular valve seat 248 juxtaposed against the inner confronting face portion of the peripheral margin of said bearing flange 81 as shown, said projections having annular shoulders 249 produced by terminal tapering enlarged heads 250, adapted to engage the left marginal faces of said holes 246 to stabilize the seat element 248 in the position shown, said tapering surfaces on said projection heads facilitate pressing the heads through said holes to effect stabilization of the seat 248.

FIGURE 16 discloses another modification of the control valve device CV based on the modified structure shown in FIGURES 14 and 15, and wherein the C-washer 243 carried by the pedal push-rod 14 loosely projects into the cylindrical wall 180 of the cup-shaped member 177 containing the air filtering element 181 as shown in FIGURE 3 of the main embodiment, and the free rounded end of the push-rod 14 is connected to the air-valve element 151 by means of a rubber grommet (O-ring) engaging an internal annular groove 253 formed in the cylindrical surface of the socket 154 and a circularly aligned external annular groove 254 formed in the push rod 14 adjacent the free rounded end thereof whereby said air-valve element 151 and push-rod 14 move axially as a unit with universal movement of the push-rod accommodated as a function of the resilient nature of said O-ring. The aforesaid valve spring 174 is operatively positioned between the left side of the partition wall 144 and said C-washer 243, and is effective to bias the outer and inner fluid-controlling elements OE and IE, respectively, toward each other to effect closure of the air-valve AV in response to engaging the valve face 155 with the valve seat 158 carried by the outer fluid-controlling element OE against the left side of said partition wall 144, otherwise this modified structure operates in the same manner as described in connection with the main embodiment, under manual actuation of the push-rod 14 and connected air-valve element 151 as a unit to close the vacuum-valve VV and actuation of the former relative to the latter stabilized in closed position to open the air-valve AV in that order, said valve spring 174 being effective to close the air-valve AV and open said vacuum-valve VV in cooperation with the aforesaid reactive and return spring 198 and master cylinder piston spring 20.

FIGURES 17 and 18 disclose a modified form of the locking tabs 27 for joining the two cylinder shells 25, 26 and peripheral looped portion of the power-diaphragm wall 74 in an airtight unitary assembly. This modified structure eliminates the integral locking tabs 27 of the main embodiment in favor of detachable spring clips 255 formed with a short vertical segment 256 which terminates at its inner end portion in an angularly disposed locking segment (tab) 257 adapted to engage the confronting working edges 36 defining the openings 37 aforesaid to perform the same locking function described in connection with locking tabs 27 of the main embodiment. The flat top walls 258 of a plurality of circumferentially spaced embossments 259 formed in the peripheral margin defining the open end of the flange wall 31, are provided with transverse rectangular slots 260 which receive the vertical segments 256, respectively, of the spring clips. Normally, the locking segments 257 prior to assembly of the two shells 25, 26, are disposed at a greater angle to the vertical segments, respectively, so that when the two shells, that is, their respective cylindrical walls are forced into telescopic relationship as shown in assembled relation (see FIGURE 3), the closed curving end of the outer loop of the diaphragm wall 74 comes into engagement with the underside of the locking segments 257 and thus forces them radially outwardly to induce spring action of said clips whereby upon the two cylinder shells 25, 26 reaching assembled relation as shown in FIGURE 3, said locking segments (tabs) 257 "snap" inwardly into engagement with the confronting working edges defining said openings 37, respectively, wherein the extreme free ends of said locking segments engage the confronting working edges and thereby locking the two shells as a unit to produce the booster power cylinder BC. It is thus seen that the springy characteristic of the spring clips enables the locking segments to radially move inwardly or outwardly with respect to the confronting working edges aforesaid to lock and unlock, respectively, the two cylinder shells 25, 26, and that the laterally opposing edges on the locking segments 257 engage the aforesaid confronting lateral edges, respectively, of the openings 37 to prohibit relative displacement between said shells thus establishing the said shells against rotative and longitudinal movements relative to each other. Moreover, the aforesaid embossments 259 define a corresponding plurality of blind cavities 261. A corresponding plurality of blind slots 262 extend through the shouldered bead 33 defining the periphery of the outer loop of said power-diaphragm PD and a portion of the normal wall thereof coextensive with said cavities, to enable said locking segments to engage said cooperating working edges of said openings 37, respectively, and also insertion of a suitable tool against the underside of said locking segments to force them radially outwardly to disengage them from their respective working edges 36 and thereby effecting disconnection of said pair of cup-like members 25, 26 and looped portions of said power-diaphragm PD for disassembly thereof.

FIGURES 19 and 20 illustrate another modified form of the control valve device CV wherein an integral hollow extension 265 projects rearward from the valve face side of said air-valve element 151 through said outer air chamber 146 as shown. The inner elongated portion 266 of said extension is in truncated configuration and terminates at its open end in a horizontal externally threaded portion 267. An adjustable annular spring seat member (plate) 268 in L-shaped cross section is provided with an elongated hex-profiled sleeve 269 having internal threads which receive the threaded portion 267, and the inner end of said sleeve defines an annular outstanding flange 270 which receives reaction from the continuously engaging end of said valve spring 174. Intersection of said sleeve 269 and flange 270 is provided with a plurality of circumferentially spaced angular air ports 271. The cup-shaped member 177 aforesaid is processed with an enlarged central circular opening 272 through the bottom wall 273 and through which the rear end portions of said hex-profiled sleeve and extension project. The annular space between the aforesaid sleeve flange 270 and bottom wall 273 is filled with a complementally formed sponge-like air filtering element 274 as shown, and the arcuate spaces 275 obtaining between the said opening 272 and periphery of the hex-profiled sleeve enable air ingress into said filter element (see FIGURE 20). This filtering element is under deformation when said pair of fluid-controlling elements OE and IE, respectively, is in normal relaxed unapplied position as shown in FIGURE 19, and expands to maintain said space filled in accordance with the change in said annular space due to relative movement of the inner air-valve element with respect to the outer fluid-controlling element OE to applied position shown in FIGURE 11 of the main embodiment. Air ingress into the outer air chamber 146 passes through said arcuate spaces 275, filtering element 274, and air ports 271 for control by the aforesaid valve face and seat 155, 158, respectively, defining the aforesaid air-valve AV.

The free rounded end 276 of the input element (push-rod) 14 is provided with a longitudinal blind surface groove 277 which loosely receives the rounded end 278 of a pin 279 which is press-fitted into a radial bore 280 provided in the air-valve element 151 in alignment with one of its longitudinal surface channels 172 aforesaid as shown. The rounded end of said pin 279 loosely cooperates with said groove 277 to stabilize the air-valve element 151 against rotation so that torque applied to the hex-profiled sleeve 269 is effective to rotate the latter relatively to said extension 265 to advance or retract the spring seat 268 according to the desired normal rate of compressive deflection of valve spring 174 as is understood. Accordingly, upon the rounded end of the push-rod 14 engaging the bottom of the socket in the air-valve element 151, the pin-and-slot connection aforesaid provides unrestricted universal movement of the push-rod relative to said air-valve element 151.

The aforesaid adjustable spring seat 268 is normally positioned medially of the threaded portion 267 which defines a commercially acceptable rate of normal compressive deflection of the valve return spring 174. However, if pedal pressure is desired changed from the installed reaction to a heavier reaction, for example, a wrench applied to the hex-profiled sleeve 269 is effective to rotate the spring seat member 268 clockwise to selectively advance to the left relatively to said extension 265 as viewed in FIGURE 20 and thereby correspondingly closing the coils of spring 174 to produce an abnormal rate of compressive deflection according to driver's choice of the amount of force he desires to exert on the brake-pedal BP as is understood. Therefore, the spring seat member 268 is capable of manual adjustment along the extension 265 at will toward and away from said spring 174 to increase and decrease, respectively, the normal tension of said spring with resultant variation in the amount of force required on the brake-pedal for actuation of the control valve device CV from unapplied to applied position. Since the relative rates of normal deflection of the springs used in the present booster device BD determine initial operator input force to inaugurate booster-assist in operating the vehicle brakes, it follows that a hard-and-fast rate of deflection for all such springs produces an inflexible design incapable of adjustment after reaching the ultimate user to meet the critical objection of the general public from the standpoint of booster over-sensitivity. The present modification meets this objection by providing a wide range of normal spring rates between said pair of fluid-controlling elements OE and IE, respectively.

OPERATIONAL SUMMARY

Reference is now made to FIGURE 3 wherein the relative positions of the working parts correspond to the booster device BD being in released "power-off" disposition, that is, the vehicle brakes are released. The booster chambers 51, 52 are at the same sub-atmospheric pressure and are isolated from atmospheric pressure by means of the aforedescribed sealing means SM and bellows member BM, respectively. Under these conditions, the power-piston assembly PP is at its extreme right position in the booster cylinder BC. The valve spring 174 is effective to urge the inner valve element 151 toward the outer valve sleeve 122 and relatively to the power-piston assembly PP to close the air-valve AV and thereby isolating atmospheric pressure in the air-control chamber AC from the variable pressure chamber 52, and the power-piston assembly PP to said extreme right position under spring 198, and wherein the power-diaphragm PD engages the embossment 112 and the valve cage flange 95 in abutment with said bushing flange 111 to stop the piston assembly PP in its relaxed "power-off" position. The master cylinder piston return spring 20 cooperates with spring 174 through the aforesaid force and reaction-lever assembly LA to apply a proportionally reduced biasing force according to the leverage ratio effective in said lever assembly, against the inner air-valve element 151, and the reactive and return spring 198 reacts continuously on the movable spring seat 188 and inner air valve element, to assist said spring 174 in opposing pedal-actuation of said inner air-valve element 151.

The booster chambers 51, 52 are in communication with each other via said vacuum ports 82, said open (unseated) vacuum-valve VV comprising said valve face and seat 125, 126, respectively, and said air-vacuum ports 91. Consequently, pressures on opposite sides of said power-piston assembly PP are equal thus producing what is commonly termed by the industry a "vacuum-suspended" status thereof.

Actuation of the vehicle brakes is accomplished by applying foot pressure to the foot-pad of the pedal BP to initially actuate the outer fluid-controlling element OE to effect seating of valve face 125 on its complemental valve seat 126, as a unit with the inner fluid-controlling element IE in seated closed position under influence of the normal rate of compressive deflection of spring 174 with opposing reaction from spring 198. Closed position of the inner fluid-controlling element IE is defined by the valve face 155 in engagement with its complemental valve seat 158 carried by the outer fluid-controlling element OE. This initial operation of the inner and outer fluid-controlling elements OE, IE, respectively, under spring-load is effective to move the inner ends of the reaction levers 185 to their dashed line position shown in FIGURE 10 which also effects forward unitary movement of the aforesaid spring seat member 188 to negate reaction from spring 198 against the aforesaid power-piston assembly PP therefore the cup-shaped member 73. However, it is important to note that even though reaction from spring 198 has been removed from the power-piston assembly PP, the stabilized condition of the booster push-rod 7 and connected master cylinder piston 17 acting on the column of fluid in the hydraulic lines 19 and wheel cylinders WC, is effective for reaction levers 185 to rock on their fulcrum points on the aforesaid pressure member 195 and thereby rotating these levers in a clockwise direction as viewed in FIGURE 3 to the dashed line position of FIGURE 10, to render the outer ends of said levers effective as a fulcrum on the aforesaid sleeve-type member 83 to maintain the piston assembly PP in its "power-off" position shown in FIGURE 3 while the pressure member 195 is forced proportionally forwardly to move the master cylinder piston 17 sufficiently to take up any undue backlash (slack) between the latter and the wheel cylinders WC which amounts to substantially closing the compensating port 22 thus conditioning the master cylinder to pressurize the fluid and displace the same into said wheel cylinders to apply the vehicle brakes as is understood.

Upon completion of the aforedescribed initial pedal-actuation to condition the booster device BD for "power-on" operation to assist the operator in effecting a brake-applying operation, the operator applies an increasing force to the pedal BP which causes the valve spring 174 to yield opposed by a substantially halted status of the booster push-rod 7 and power-piston assembly PP under resistance from the column of pressurized brake-fluid in the hydraulic lines 19, and thereby effecting relative movement of the inner air-valve element 151 to unseat the same by disengaging the valve face 155 from its complemental valve seat 158 carried by the outer fluid-controlling element OE, to open the air-valve AV for ingress of atmospheric pressure from the air-control chamber AC into the variable pressure chamber 52 via surface channels 172, 173 and air-ports 143. It should be noted here that upon the power-piston assembly PP moving from its "power-off" position shown in FIGURE 3, air admitted to the variable pressure chamber 52 under control of the air-valve AV may also flow through the central opening 96 defined by the inturned flange 95. Thus, when the power-piston assembly PP is in "power-on" position as shown in FIGURE 11, air flow through the open air-valve AV may enter the variable pressure chamber 52 via the aforesaid opening 96 in the flange 95 of the valve cage VC to negate such function of the air-ports 91, but when the power-piston assembly PP is in normal "power-off" disposition as shown in FIGURE 3 with the vacuum-valve VV closed as shown in FIGURE 11, the opening 96 is blocked by reason of the flange 95 being in engagement with the bushing flange 111, thus under the latter condition, initial air flow into the booster chamber 52 must necessarily pass through the air-ports 91 to inaugurate operative energization of the power-piston assembly PP. With the power-piston assembly PP under a pressure differential created in the above-described manner, actuating force is transmitted by the power-piston assembly PP via the reaction lever assembly LA to the push-rod 7 and connected master cylinder piston 17 to pressurize the brake-fluid in the hydraulic lines 19 and wheel cylinders WC with consequent application of the vehicle brakes, and at the same time the reactive force from the master cylinder piston 17 is proportionally effective according to the established leverage ratio in the lever assembly LA via the inner ends of the reaction levers 185 in engagement with the lateral flanges 187 integral with the aforesaid movable spring seat member 188, on the inner air-valve element 151 and connected pedal push-rod 14 as shown in FIGURE 1.

During a brake-applying operation, should the operator desire to hold the brakes "on," it is only necessary for him to halt pedal movement which enable the power-piston assembly PP to advance slightly relatively to the inner valve element 151 in a fluid-pressurizing direction which advancement carries with it the closed condition of the vacuum-valve VV to bring the valve seat 158 into engagement with the valve face 155 on the inner air valve element 151 thus closing the air-valve AV which produces what is termed a "lapped" closed relation of both the vacuum and air-valves VV and AV, respectively to stabilize the opposing operating forces on the power-piston assembly PP to maintain the vehicle brakes applied in accordance with the halted position of the brake-pedal BP.

My novel control valve device CV produces the well known follow-up control over movements of the power-piston assembly PP in a fluid-pressurizing or releasing direction, therefore incremental movements of the brake-pedal BP are effective to cause corresponding movements of the power-piston assembly PP. It is important to stress here that the present booster device BD features a special advantage in predictable braking control by providing for initial tensioning of the working parts to take up the slack (backlash) prior to activating the control valve device CV to applied position effective to induce differential pressures at opposite sides of the power-piston assembly PP to actuate the same. This sequence of operator control over the control valve device CV contributes smooth braking applications with minimal pedal movement, and especially is the operator provided with an awareness of the degree of braking force in effect at any given position of the pedal BP.

Even though the aforesaid tensioning operation by the pressure differential activated bellows member BM is dispensed with in favor of initial pedal-actuation to effect the same tensioning operation as would be the case were the FIGURE 12 modification utilized, the working parts within the booster device BD would be placed under tension for removal of lost-motion (backlash) therebetween to sensitive pedal-actuation to control the ensuing booster operation to assist pedal-actuation as is understood, in applying the vehicle brakes. Thus the aforesaid slack take up may be effected either manually or automatically.

As the power-piston assembly PP moves under pressure differential such movement is transmitted to the outer reduced end portion of the reaction levers 185 causing them to pivot about their inner reduced end portions on the lateral flanges 187 integral with the movable spring seat member 188 which may be assumed held against movement to the right as viewed in FIGURE 11 by manual force reacting on the pedal BP which is connected to the inner air-valve element and the latter continuously acts on the spring seat member 188. Intermediate portions of the reaction levers 185 push against the pressure member 195 in engagement with the outer end of the pressure-applying elements 197 defining the periphery thereof and thereby moving the booster push-rod 7. Such operation causes power-application of the vehicle brakes in part, that is, the power-piston assembly PP pushes the push-rod 7 and master cylinder piston 17 in a fluid-pressurizing direction in cooperation with follow-up control by the pedal push-rod 14 with consequent displacement of fluid into the wheel cylinders WC as is understood. A portion of the power-application is transmitted through the reaction levers 185 rearwardly to the pedal push-rod 14 to provide driver awareness of the degree of effective braking force.

Upon applying the vehicle brakes to the degree necessary, movement of the pedal push-rod 14 is halted and the differential pressures in the power cylinder chambers 51, 52 causes the booster- piston assembly PP to slightly advance in a fluid-pressurizing direction which engages the valve face 155 on the inner air-valve element 151 with the valve seat 158 carried by the outer valve sleeve 122 so that the control valve device CV is again in "lapped" holding position, that is, both the vacuum-valve VV and air-valve AV are closed and under such conditions, the constant pressure chamber 51 is under vacuum (negative) pressure isolated from the variable pressure chamber 52, the latter being at such greater pressure as to produce a stabilized condition of the forces reacting on opposite sides of said power-piston assembly PP, thus as long as foot pressure is maintained on the pedal BP, the vehicle brakes will remain in their existing applied condition with minimal pedal pressure required.

Release of the vehicle brakes from the aforesaid applied holding position, is effected in accordance with the extent and rapidity of removal of operator (manual) pressure from the pedal BP. The pressurized status of the fluid column in the brake lines 19 reacts on the master brake cylinder piston 17 thus urging it to the right as viewed in FIGURES 1 and 3. Since the control valve device CV is in "lapped" position just prior to release toward unapplied position of FIGURE 3 due to pressure differential balancing with work load reaction to hold the power-piston assembly PP, the lever assembly LA moves the inner air-valve element 151 under influence of the push-rod 7 moving to the right, such movement of the inner air-valve element 151 being effective to close the air-valve AV and open the vacuum-valve VV as a function of the valve spring 174 assuming its normally compressed status. This releasing operation of the control valve device CV induces lower pressure in the variable pressure chamber 52 to substantially equal the constant vacuum pressure in the booster chamber 51 to release the power-piston assembly PP for movement toward normal "power-off" position under hydraulic pressure reacting on the master cylinder piston 17 supplemented by the biasing forces to the right from springs 20, 198. It should be recalled that spring 198 is effective to move the power-piston assembly PP to the right only during a releasing operation of the vehicle brakes, but in a brake-applying operation this latter spring is ineffective to oppose movement of the power-piston assembly PP in a fluid-pressurizing direction thus enabling the latter to have unrestricted power-thrust.

If pedal release is interrupted at some point before reaching fully release position as shown in FIGURE 1, the power-piston assembly PP will continue to move to the right relatively to the inner and outer fluid-controlling element OE, IE, respectively, so that the vacuum-valve VV again becomes closed to place both the vacuum and air-valves VV, AV, respectively, in "lapped" closed relationship thus enabling the pressure that remains in the variable pressure chamber 52 to maintain the vehicle brakes in a partially applied condition until the pedal BP is fully released. Upon full release of the pedal BP, the push-rod 14 and outer fluid-controlling element OE will again move to the right into engagement with its stop means defined by the inturned flange 95 to open the vacuum-valve VV as shown in FIGURE 3 which places the booster chambers 51, 52 in communication with each other via open vacuum-ports 82 and with the source of vacuum via the aforesaid check-valve CK until pressure in said chambers is balanced corresponding to vacuum-suspended or "power-off" condition of the booster device BD.

An important and advantageous operating feature of my novel control valve device CV resides in the use of differential pressures on opposite of the valve flange 121 when in seated position as shown in FIGURE 11 to supplement thrust transmitted from the input element 14 via said valve spring 174, to maintain the vacuum-valve VV closed until deliberate opening is desired. In this manner fortuitous "shuttling" between the valve face and seat 12, 126, respectively, is avoided which if present would cause erratic operation of the booster device BD.

The aforedescribed operation of the booster device BD comprehends the normal "power-on" and "off" operation while the engine is running to produce vacuum in the intake-manifold IM. In the present booster device BD safeguards are provided to insure effective braking upon failure of the vacuum source due to fortuitous stalling or stopping of the engine, or any impairment of the booster force from other causes. As previously described, the check-valve CK is provided in the vacuum line 55 to the intake-manifold IM which eliminates the use of a separate vacuum reservoir since vacuum pressure is maintained in the booster cylinder BC even though the vacuum source has failed. It will be noted that a relatively large constant pressure chamber 51 has been provided for storage of sufficient vacuum pressure for at least three to four power-brake operations while the engine is stopped which doubles the number of power-brake applications normally provided by competitive booster devices as a safeguard against power-runout or loss of the vacuum producing source so that the drive can safely bring the vehicle under control with minimum effort on his part. It is especially desirable where women drivers are concerned, that "power-on" operation of the vehicle brakes be extended to more than one or two applications so that in case of vacuum failure for any reason will not present a hazardous condition due to the excessive amount of manual effort required to actuate "touch-pedal" power-brakes to apply the brakes. Present-day power-brakes which are controllable from a "low-pedal" necessarily sacrifice needed leverage between the pedal and master cylinder to gain such low position of the pedal foot-pad to lie in the same plane with the accelerator pedal when released to accommodate "swinging" the foot of its heel between the two pedals which alledgedly reduces the time factor in executing a brake-applying operation especially in an emergency stop. However, there is a serious disadvantage which can arise from having both pedals in substantially the same plane when released since the foot may be inadvertently positioned to overlie both pedals and upon depression, causing simultaneous acceleration of the engine and application of the service brakes with possible resultant skidding or a collision especially at low vehicular speeds.

A further novel advantage provided in the present booster device BD resides in the utilization as aforesaid of a pressure differential to maintain the vacuum-valve VV closed in cooperation with the valve spring 174, that is, "vibratory" or "shuttle-action" on its seat is prohibited as a result of possible erratic foot pressure on the brake-pedal BP. Once this valve is closed, the inner side of the bell-shaped valve flange 121 is under vacuum pressure from the constant pressure chamber 51 via vacuum ports 82 while the opposite side thereof is under a greater pressure according to the pressure existing in the variable pressure chamber 52 during a "power-on" operation.

Further considering the relative installed rates of the compressive deflections of spring 174, 198 and 20 which have a definite bearing on the operational behavior of the present novel booster device BD as previously described, experimental as well as commercial use of the present booster device dictates that the normal installed compressive deflection of the master cylinder piston return spring 20 and the reactive and return spring 198 should be capable of supporting a load of 7# and 8#, respectively, for example, and since the reaction of the 7# loaded spring is effective on the brake-pedal BP at a reduced level by reason of the leverage ratio in the lever assembly LA, a combined reaction from springs 20 and 198 is produced and which approximates 11# reacting on the foot-pad of the pedal BP to produce a resistance of 3 to 4# for the operator to overcome, the latter resistance depending, of course, on a corresponding leverage ratio between the pedal BP and push-rod 14, that is, the foot-pad of said pedal, to lower the aforesaid effective spring reaction to produce a comfortable pedal-operating characteristic without sacrificing drive awareness of the amount of braking effort in effect at any given position of the pedal BP.

The afore-described pressure differential means (actuator) for automatically taking up the slack between the working parts of the booster device BD and initially pressurizing the fluid in the brake lines 19 of the related hydraulic brake system, enables only a "touch" of the brake-pedal BP to inaugurate booster power-assist becouse when vacuum is present within the bellows member BM therefore in the booster chambers 51, 52, the outer and inner fluid-controlling elements OE, IE, respectively, are initially moved as a unit by reason of the spring load therebetween with the valve face 155 in seated engagement with the valve seat 158 comprising the air-valve AV in closed position which operation additionally deflects the springs 20, 198 to subject the working parts and fluid column between the wheel and master cylinders WC and MC, respectively, under tension in readiness for ensuing additional operator force to be exerted on the brake-pedal BP to close the vacuum-valve VV and open the air-valve AV to create a pressure differential across opposite sides of the power-piston assembly PP to operatively energize the same for power-assist. Since the slack is now taken up substantially in the booster device and brake system, smooth mergence of operator force on the brake-pedal with the effectiveness of the power force from the booster device, results in a highly desirable pedal-operating characteristic which provides operator physical perception of the degree of braking force in effect at any given position of the pedal for predictable braking control.

In addition to the afore-described initial resistance provided by the combined reaction from springs 20, 198, overcoming of the valve return spring 174 is required to accommodate opening of the air-vale AV to produce the aforesaid pressure differential in booster chambers 51, 52. This latter valve spring should be installed, for example, under a normal rate of compressive deflection capable of supporting a load of approximately 8 to 10# depending on the degree of sensitivity desired in actuating the outer and inner fluid-controlling elements OE, IE, respectively, relatively to admit atmospheric pressure into the booster chamber 52. It is thus seen that manual force on the brak-pedal BP is defined by the combined reactions of the three aforesaid springs 20, 198, and 174 to inaugurate booster power-assist. An acceptable pedal force of 8 to 9# should be found satisfactory to the majority of power-brake users, however, such pedal force may be varied to suit drive choice by changing the relative rates of normal compressive deflection of springs 198 and 174 to produce light to hard reaction according to driver choice.

It is thus seen that the aforesaid relative relationship between the installed compressive deflections of springs 20, 174, and 198, and particularly the latter two springs, afford desirable results in the way of predictable braking control as well as in the amount of manual input force required to render the booster device BD operative to provide braking-assist according to driver choice.

Further beneficial results in braking control of a motor vehicle or the like equipped with my power-brake system may also be realized in the selective use of the aforesaid valve spring 174 between the said pair of fluid-controlling elements OE, IE, respectively, as shown in FIGURE 3 or between the pedal push-rod 14 and outer fluid-controlling element OE as depicted in FIGURES 14 and 17. Moreover, special emphasis is directed to the spring 228 shown in the modified structure of FIGURE 12. This spring may be selectively installed at such rates of normal compressive deflection that initial actuation of the control valve device CV as a unit under said bellows member BM and/or pedal BP to take up the slacking in the booster device BD in the manner previously described, is effective to move the power-piston assembly PP, lever assembly LA and booster push-rod 7 as a unit until the latter develops sufficient work resistance against the master cylinder piston 17 to substantially halt movement of said unitary components, and thereafter, additional manual force exerted on said pedal BP is effective to overcome spring 228 for relative movement of the outer and inner fluid-controlling elements as a unit, and the latter relative to the former in that order accompanied by actuation of the lever assembly LA to the position shown in FIGURE 11 wherein said control valve device CV is in applied position and the power piston assembly PP in energized operating position to produce power-assist as is understood. However, if spring 228 is set for a lesser rate of normal compressive deflection when installed, initial unitary movement of the control valve device CV under initial movement by the bellows member BM and/or said pedal BP as the case may be, is effective to move said valve device relatively to said power-piston assembly PP stabilized in normal released position as shown in FIGURE 3 under leverage-action from said lever assembly LA pivoting on the intermediate portions of said levers 185 in engagement with said pressure-applying elements 197 defining the periphery of said pressure member 195 and reaction from the master cylinder piston spring 20 via said booster pushrod 7 reacting continuously on said pressure member 195. Therefore, it is seen that the installed rate of compressive deflection of spring 228 determines whether the power-piston assembly PP remains in its normal released position prior to operative energization thereof while the control valve device CV is being actuated to applied position or is being moved from such released position as a unit with initial unitary movement of the control valve device CV before being operatively energized under applied position of the control valve device CV.

Further examples of the interchangeability of similar components disclosed in the main embodiment and in modified structures shown in FIGURES 13, 14, 16, 18 and 19, are apparent from a study of their structural and functional relationships. For instance, sealing means SM illustrated in FIGURE 3 may be substituted for the tubular accordion-type bellows member 235 shown in FIGURE 13; the flange 165 on the truncated member 163 of the main embodiment may be substituted for the C-washer 243 carried by the input element 14 as shown in FIGURE 14; the O-ring connection 252 of FIGURE 16 may be readily substituted for the one-way connection therebetween as shown in FIGURE 3 and in certain of the modified structures; the spring clips 255 disclosed in modification FIGURE 17 may be used in lieu of the locking tabs 27 shown in the main embodiment (FIGURE 7); and the integral hollow extension 265 shown in the modified structure of FIGURE 19 may be employed instead of the detachable hollow truncated member 163 of the main embodiment shown in FIGURE 3 with the added advantage of the adjustable member 268 for varying the installed rate of compressive deflection of the valve return spring 174 without having to disassemble the control valve device CV, to provide pedal-actuating pressures in accordance with driver choice, thus overcoming the critical objection to use of power-brakes by the general motoring public from the standpoint of being over-sensitive producing erratic braking control thus lacking predictable braking control to smoothly apply the vehicle brakes under joint operation of the brake-pedal BP and booster device BD.

The design of the present booster device BD is the outgrowth of many years in the development of booster-activated brakes. Such extended experience has made it unmistakably clear that use of relatively simple sheet metal stampings for the major working parts contributes to a simple mechanism easily and economically producible with long-service life free of maintenance expense.

In the event of loss of vacuum, the pedal BP may be moved in a fluid-pressurizing direction to engage the end of the reduced extension 152 with the bottom of the blind bore 184 of the booster push-rod 7 to provide "straight-through" transmission of manual force from the pedal BP to actuate the master cylinder piston 17 but with greater force being required than normally needed to operate conventional foot-operated master cylinders since resistance from the spring 198 and friction between the outer fluid-controlling element OE and support bushing 111 as well as working the air through the booster cylinder chambers 51, 52 via said check-valve CK and control valve device CV, and reduced pedal purchase for the lower pedal portion must be overcome.

The foregoing description considered with the drawing is believed to set forth the achieving of the above-stated objects and the advantages to be derived therefrom. It should be apparent from the disclosure as a whole that the structural and functional nature of the invention represented by the main embodiment and related modifications thereof bear distinct patentable relationships, therefore, the disclosed modifications do not define inventive concepts of an independent nature with respect to each other or to the main embodiment shown in FIGURES 1 through 11.

Reference is now made to the terminology used in the foregoing description and in the appended claims in which the identifying expressions and/or terms employed are intended to convey meanings which include the range of reasonable equivalents in the patent sense. For example, the expressions "booster device," "booster mechanism," "power-brake," "power cylinder," "booster cylinder," "servomotor," "motor," "power-piston assembly," "piston," or "wall means" are intended to include any casing and/or chamber having a pressure-responsive movable member therein, whether such member takes the form of a solid piston or a flexible power-diaphragm in part, or some other component serving the same purpose. The terms "front," "forward," "rear," "bottom," "top," "right," "left," and other directional words or characters are intended to have relative connotation only for convenience in describing the structure as presented on the drawing by way of example, and are not intended to be interpreted as requiring any particular orientation with respect to associated structure external to the present disclosure or the operating position thereof.

It should be understood that I do not wish to limit the invention to the above-described novel association and arrangement of elements and details, and that the invention includes such other modifications, substitutions and/or changes obvious to persons skilled in the art, as defined by the terms of the subjoined claims.

Having thus described my invention, I claim:

1. The combination of a booster-type fluid pressure operated servomotor having a fluid chamber enclosure characterized by a pair of spaced end walls having central coaxial openings, respectively, and a power-piston assembly movable between said walls from normal position in a pressure-producing direction under a pressure differential at opposite sides thereof, said piston assembly serving to divide said chamber enclosure into a constant pressure chamber and a variable pressure chamber and comprising: a cup-like member having an annular vertical segment with its central portion forwardly offset to produce a cylindrical wall with a terminal bottom wall defining a cylindrical cavity, and a horizontal flange normal to said vertical segment defines the outer periphery thereof a sleeve-type force-transmitting member acted on by said vertical segment and disposed in coaxial relation thereto; a plurality of circumferentially spaced transverse slots of rectangular configuration through the forward portion of said force-transmitting member, and is disposed in coaxial relation to the pair of openings aforesaid; an operator-operated mechanism including a pedal having a normal released position; an output element movable to perform work under joint influence of said operator pedal and said piston assembly, and adapted to operably project through one of said pair of openings; a source of pressure different from atmosphere in continuous communication with said constant pressure chamber and selectively communicable with said variable pressure chamber; a poppet-type control valve device normally occupying an unapplied position from which it is movable to an applied position relatively respect said piston assembly under said operator pedal, to control follow-up movements of the former, said control device including an outer fluid-controlling element and an inner fluid-controlling element in coaxial telescopic relationship, said outer control element comprising: an annular outstanding valve flange having a central hub-like portion defining the inner terminal portion of an elongated cylindrically-walled tubular valve member supported on a slidably projectionable through the other of said pair of openings to the exterior of said chamber enclosure; an annular valve member defining the forward side of the peripheral margin of said valve flange and having an annular valve face which is normally spaced predeterminately from a complemental valve seat on said cavity bottom wall, to produce a "vacuum-valve"; an annular closure plate for said cylindrical cavity contiguous to the rear side of said vertical segment to produce a valve cage for housing said valve flange; fastening means for securing said force-transmitting member, vertical segment and closure plate in that order in a rigid coaxial assembly, said closure plate having a cylindrical offset wall opposite said first-defined cylindrical wall and a centrally apertured inturned flange normal to the former offset wall for engagement by said valve flange to establish said predetermined spacing between said valve face and seat; a port through said closure plate for maintaining communication between the interior of said valve cage and said variable pressure chamber; another port through said cavity bottom wall for maintaining communication between said constant and variable pressure chambers and interior of said valve cage when said "vacuum-valve" is open; an internal annular groove formed in said hub-like portion and fitted with a complemental packing; an inner and an outer air chamber defining the interior of said tubular valve member with their opposing outer ends open; an annular partition wall between said air chambers defining a circular opening provided with a medial internal annular groove; a pair of diametrically-opposed air-ports through the wall of said tubular valve member adjacent said valve flange for maintaining said inner air chamber in communication with the exterior of said tubular valve member and the interior of said valve cage in part, said inner fluid-controlling element comprising: a cylindrical air-valve element interfitting said inner air chamber in part and which projects forwardly through said packing in said hub-like portion of said valve flange and through the flanged opening aforesaid to slidably support said piston assembly in coaxial relation thereto; an elongated reduced cylindrical extension coaxially projects forwardly from said air-valve element to produce an annular shoulder therewith; an axially disposed socket in the rear end portion of said air-valve element and terminating at its open end in an annular valve face; a resilient valve member in L-shaped cross section having a sleeve portion projecting into said opening in said partition wall and stabilized therein by an external annular bead in engagement with the aforesaid internal groove medially formed in said last-defined opening, and an annular outstanding flange contiguous to the forward side of said partition wall defining a valve seat normally engaged by said last-defined valve face to produce an "air-valve"; an external annular surface air channel indented in said air-valve element in continuous communication with the aforesaid pair of air-ports in said tubular valve member; a plurality of external longitudinal surface air channels indented in said air-valve element in circumferentially spaced relation and continuously communicating with said annular air channel and with that portion of said last-defined valve seat on said partition wall exterior of said last-defined valve face; a normally compressed spring reacting between said pair of fluid-controlling elements to bias them toward each other to engage said last-defined valve face and seat, the normal biasing force of said spring being of such magnitude as to enable unitary movement of said pair of fluid-controlling elements toward seating engagement of said last-defined valve face and seat and thereby blocking ingress of atmospheric pressure into said variable pressure chamber and enabling the aforesaid predetermined spacing of said first-defined valve face and seat to communicate balanced negative (vacuum) pressure from said constant pressure chamber to said variable pressure chamber via said ports in said cavity bottom wall and closure plate, respectively, defining said valve cage; an internal annular groove formed in said outer air chamber adjacent the open end thereof for reception of a retaining ring; a filter cap containing porous material for filtering air ingress into the outer air chamber aforesaid and which is stabilized by said retaining ring, said cap being provided with a central opening; an input element associated with said operator mechanism and pivotally connected at one end to said pedal to operably project through the other of said pair of openings into said socket in said air-valve element in engagement with the bottom thereof to actuated the latter; reaction and force-transmitting mechanism comprising: a plurality of circumferentially spaced levers radially disposed with respect to the axis of said air-valve element and operably associated therewith in part; a spring control member characterized by an annular inner and an outer segment, said inner segment being centrally apertured to receive the aforesaid cylindrical extension projecting forwardly from said air-valve element and thereby supporting said spring control member, the latter normally engaging the cavity bottom wall aforesaid and said annular shoulder defining the juncture of said cylindrical extension and air-valve element proper; a plurality of forwardly projecing lateral flanges extruded out of the said inner segment and provided with a corresponding plurality of transverse rectangular slots radially aligned with the first-defined plurality of transverse slots, respectively; a corresponding plurality of clearance openings radially formed in said outer segment and intersecting said inner segment, said levers being pivotally mounted at their reduced extreme portions in the aforesaid first and second-defined transverse slots, respectively; a pressure member provided with a central aperture through which said cylindrical extension on said air-valve element passes and a corresponding plurality of angular projections defines the outer periphery thereof and which projects into said clearance openings, respectively, into engagement with an intermediate portion of said levers, respectively; a blind axial bore formed in the inner end portion of said output element in continuous engagement with said pressure member, for reception of the terminal free portion of said air-valve cylindrical extension with the bottom of said bore predeterminately spaced normally from the confronting end of said terminal portion, said pressure member, and levers interconnecting said force-transmitting member and spring control member, produce a mechanical connection therebetween with said angular projections defining the effective leverage ratio of reaction transmission from said output element to said operator pedal and said piston assembly, initial movement of the aforesaid input element under operator force applied to said pedal being effective to simultaneously move both of said fluid-controlling elements as a unit under normal force of the aforesaid spring without modulating its normal rate of compressive deflection, to seat said first-defined valve face and thereby closing said "vacuum-valve" to isolate said constant and variable pressure chambers and simultaneously move the inner ends of said levers pivoting on their respective working edges produced by the transverse slots in said force-transmitting member to move said pressure member having said angular projections and said output element as a unit to intensify the work being performed by said output element to such magnitude causing substantial arrest of movement of the latter whereby additional operator force applied to said pedal is effective to overcome the normal rate of compressive deflection of the aforesaid spring and thereby accommodating relative movement of the air-valve element to unseat for admission of atmospheric pressure via surface air channels aforesaid on said air-valve element, pair of air-ports in said tubular valve member and said port through said closure plate into said variable pressure chamber to create said pressure differential at opposite sides of said piston assembly effective to move the same in follow up relation according to movements of the operator pedal aforesaid, movement of said piston assembly being effective to transmit operating force through said levers reacting proportionally on said air-valve element therefore said pedal via said lateral projections on said pressure member acting on said output element to perform the desired amount of work according to operator force effective on said operator pedal; and another normally compressed spring reacting between the one end wall aforesaid of said chamber enclosure and the peripheral margin of the outer segment aforesaid of said spring control member, to bias said air-valve element toward normal seated relation with respect to its valve seat carried by said outer fluid-controlling element and both of said fluid-controlling elements and said piston assembly as a unit toward their respective normal released positions and thereby providing a progressively increasing yieldable resistance to initial movement of said pair of fluid-controlling elements as a unit prior to relative movement therebetween under additional operator force applied to said pedal for predictable control of the amount of effective braking force, relative movement of said air-valve element being effective to disengage its valve face from the valve seat carried by the outer fluid-controlling element whereby atmospheric pressure is admitted into said variable pressure chamber to create said pressure differential at opposite sides of said piston assembly effective to move the same to perform additional work via said output element in cooperation with operator force applied to said pedal with the distribution of such work between the latter and said piston assembly being defined by the effective leverage ratio of said levers.

2. The combination according to claim 1 in which said chamber enclosure additionally comprises: a pair of cup-like members of different depths with marginal portions of their confronting open ends in radially spaced telescopic relationship, and a third cup-like member characterized by an annular horizontal flange normal to the bottom wall thereof with the latter contiguous to the bottom wall of said member of less depth, said last-defined flange being disposed in circularly spaced relationship with respect to said radial space and the marginal portion defining the open end of the member having greater depth, to produce a pair of annular spaces in overlapping relationship, and means for attaching the bottom walls of the member with less depth to the bottom wall of the third member to produce a unitary assembly thereof.

3. The combination according to claim 2 in which said piston assembly and chamber enclosure additionally comprise: an annular flange in semicircular cross section defining the outer periphery of said closure plate and which is offset from the confronting side portion of the first-defined cup-shaped member to produce an annular entrance to an annular channel of similar configuration, a flexible power-diaphragm of annular configuration supported on said first-defined cup-shaped member, said power-diaphragm having an inner annular bead defining the inner periphery thereof and which is received into the aforesaid semicircular channel under compression to effect an airtight seal therebetween with the normal wall thickness radially extending outwardly thru said entrance to encompass the first-defined cup-shaped member, a pair of radially spaced circularly aligned looped segments defining the outer peripheral margin of said power-diaphragm with the inner looped segment normally positioned between the first-defined flange and inner surface of the peripheral margin defining the open end of the member having greater depth, with its closed end projecting forwardly, the outer looped segment being disposed between the outer surface of the peripheral margin defining the open end of the member having greater depth and the inner surface of the peripheral margin defining the open end of the member having lesser depth, with its closed end contiguous to the extreme end of the peripheral margin defining the open end of the member having greater depth, an annular shouldered bead defining the outer periphery of said outer looped segment, said shouldered bead lying in intimate adjacency with the extreme end of the peripheral margin defining the open end of the member with lesser depth, whereby said outer looped segment and peripheral margins defining the open ends of said pair of cup-shaped members and said first-defined flange of said third cup-like member are tightly overlapped in circular alignment to produce an airtight seal therebetween in a rigid unitary assembly, a plurality of circumferentially spaced rectangular embossments formed in the peripheral margin of the open end of said member having lesser depth to define a like-plurality of longitudinal blind cavities having a flat top wall, a corresponding plurality of locking tabs extruded from the flat wall of said cavities, respectively, a corresponding plurality of rectangular openings provided in circular alignment with said tabs in the peripheral margin defining the open end of said member having greater depth, said openings having a transverse working edge, means for forcibly projecting said tabs radially inwardly into said openings into end-engagement with the confronting working edges to lock said pair of cup-shaped members against relative separation, a corresponding plurality of blind slots extending through said shouldered bead coextensive with said embossments, respectively, to enable said tabs to engage said working edges and insertion of a tool against the underside of said tabs to force them radially outwardly to disengage from said working edges and thereby effecting disconnection of said pair of cup-shaped members for disassembly thereof.

4. The combination according to claim 1 including a tubular flexible member comprising an elongated cylindrical wall terminating at its inner and outer ends in a pair of annular beads, respectively, with the bead at the outer end defining the inner periphery of an end wall, a series of spaced ring-like elements interfitting said elongated wall for radially supporting the latter against inward collapse, an annular member fixed on said tubular valve member adjacent the outer end thereof to support said last-defined end wall, an external annular groove formed in the outer end of said tubular valve member adjacent said fixed member for reception of said outer bead in airtight sealed relation, an outstanding annular lip defining the terminal of the opening in said other end wall and spaced from the latter to produce an annular channel for reception of the inner bead aforesaid in airtight sealed relation, an annular pressure chamber between the interior of said elongated wall and exterior of the circularly confronting portion of said tubular valve member, a bushing fast in the opening of said other end wall, a surface channel formed in said bushing for maintaining communication between said variable pressure chamber and said pressure chamber and thereby communicating negative (vacuum) pressure from said variable pressure chamber to said pressure chamber via said surface channel to longitudinally move said supported end wall of said flexible member and correspondingly collapse the latter to effect movement of said outer fluid-controlling element toward seating position to take up the slack in readiness for actual seating to close said "vacuum-valve" under initial movement of said operator pedal to isolate the aforesaid constant and variable pressure chambers for said pressure differential to be created therein upon opening said "air-valve" to activate said piston assembly in a power-assist direction.

5. The combination according to claim 1 in which the work performed by said output element is the actuation of a master brake cylinder in an automotive hydraulic brake system, said master cylinder comprising a chamber-defining body provided with a mounting flange having an exterior finished face, a longitudinal bore in said body and closed at one end and open at the mounting flange end and in which a piston is slidably disposed for movement from normal position defined by a stop element adjacent the open end of said bore, a variable pressure producing chamber disposed between said piston and closed end of said bore, a brake-fluid reservoir communicating with said pressure producing chamber, an annular fluid space encircling an intermediate portion of said piston via a pair of spaced ports, respectively, with one of said ports having continuous communication with said fluid space and the other port communicating with said pressure producing chamber when said piston is in normal position, a normally compressed spring reacting between the closed end of said bore and said piston to bias the latter toward normal position, a discharge port through the aforesaid closed end of said bore, a brake line interconnecting said discharge port with said brake system to convey pressurized actuating fluid to the latter upon said piston moving from normal position to close said other port to condition the fluid in said pressure producing chamber to be pressurized, sealing means between said opening in said one end wall and said output element for isolating the aforesaid constant pressure chamber from the open end of said bore, and means for fastening said mounting flange to the exterior of said one end wall.

6. The combination according to claim 5 in which said sealing means comprise: an offset peripheral pressure flange defining the aforesaid opening in said one end wall of said chamber enclosure, an elongated resilient sleeve having an outstanding end flange contiguous to said pressure flange in flush relation to said one end wall, a plurality of circumferentially spaced longitudinal ribs interconnected by a pair of spaced annular ribs defines the outer surface of said resilient sleeve to reinforce the same against fortuitous radial distortion and disconnection of said flanged end from said pressure flange, an inturned annular flange integral with the opposite end of said resilient sleeve and having a ring-like sealing lip normal thereto defining the inner periphery thereof, said output element being adapted to operably project through said sealing lip into engagement with said piston of said master cylinder to actuate the same, a detachable telescopic sleeve provided with a complemental outstanding pressure flange at one end to impinge said flanged end of said resilient sleeve against said first-defined pressure flange in airtight sealed relation and to support said resilient sleeve and integral inturned flange, an external annular groove defining the juncture of said inturned flange and sealing lip, an inturned annular flange defining the opposite end of said telescopic sleeve and complemental to the aforesaid inturned flange integral with said resilient sleeve, the marginal portion of the inner periphery of said inturned flange on said telescopic sleeve being adapted to engage the aforesaid juncture groove to stabilize said sealing lip around said output element, and a passage in said mounting flange for maintaing atmospheric communication with the interior of said telescopic sleeve.

7. The combination according to claim 5 in which said sealing means comprise: an offset peripheral pressure flange defining the aforesaid opening in said one end wall of said chamber enclosure, a tubular bellows member encircling the major portion of said output element in radially spaced relation, an elongated resilient sleeve defining the forward end portion of said bellows member and having an outstanding flange contiguous to said pressure flange in flush relation to said one end wall, a plurality of circumferentially spaced longitudinal ribs interconnected by a pair of spaced annular ribs defines the outer surface of said resilient sleeve to reinforce the same against fortuitous radial distortion and disconnection of said flanged end from said pressure flange, a detachable telescopic sleeve provided with a complemental outstanding pressure flange to impinge said flanged end of said resilient sleeve against said first-defined pressure flange in airtight sealed relation and to support said resilient sleeve, an external annular groove on said output element adjacent its inner end, an annular bead defining the opposite end of said bellows member and engageable with said last-defined groove to effect an airtight seal with said groove on the output element, and a passage in said mounting flange for maintaining atmospheric communication with the interior of said bellows member.

8. The combination according to claim 1 including a hollow truncated extension detachably projecting rearward from said air-valve element in coaxial relation with respect to the axis of said tubular valve member aforesaid, with its smaller end closed to nest in the aforesaid socket of complemental configuration in said air-valve element, means for attaching said smaller closed end in said truncated socket for unitary axial movement of said extension and air-valve element, an outstanding flange defining the open larger end of said truncated extension, said first-defined normally compressed spring being adapted to react between said last-defined outstanding flange and the confronting side of the partition wall aforesaid dividing the interior of said tubular valve member into the aforesaid inner and outer air chambers.

9. The combination according to claim 8 in which said attaching means comprise: a pair of diametrically-opposed locking tabs outwardly extruded from the wall portion adjacent the smaller closed end of said truncated extension, said locking tabs being characterized by resiliency, and a pair of complemental notches formed in the surface of said truncated socket for reception of the free ends of said locking tabs, respectively, under tension in engagement with transverse walls defining the rear edges of said notches, respectively, to enable said air-valve element and truncated extension to move axially as a unit, said notches being of arcuate configuration to produce opposing camming end portions whereby the opposing lateral edges of said locking tabs are engageable with said camming end portions to disengage said locking tabs from their respective notches to disconnect said truncated extension from said air-valve element in response to relative rotational movement of said truncated extension in either direction thus enabling disassembly of the control valve device aforesaid.

10. The combination according to claim 1 in which said first-defined normally compressed spring is adapted to react between the side of said partition wall opposite the side which carries the aforesaid valve seat engageable by the valve face of said air-valve element, and a detachable ported abutment element carried by said input element engaging the bottom of the socket in said air-valve element whereby said last-defined spring is effective to normally preload said outer fluid-controlling element and said input element for initial movement as a unit to move said valve face on said valve flange into seating engagement with its cooperating valve seat carried by said piston assembly, and for accommodating relative movement of said air-valve element with respect to said outer fluid-controlling element upon the latter seating to create said pressure differential in said constant and variable pressure chambers to effect movement of said piston assembly in a work-producing direction.

11. The combination according to claim 10 in which said input element is connected at its free end to said socket in the air-valve element for two-directional unitary movement thereof whereby reaction from said last-defined spring on said input element abutment is effective to bias said air-valve element into seated engagement with its confronting valve seat carried by the partition wall aforesaid.

12. The combination according to claim 11 in which said reactive and return spring is adapted to react on the power-piston assembly only to bias the latter toward normal released position, and a third normally compressed spring is adapted to react between said cavity bottom wall of said piston assembly and said air-valve element to sequentially bias the latter relatively into seated engagement aforesaid and as a unit with said outer fluid-controlling element in cooperation with said first-defined spring to unseat said valve face on said valve flange from said valve seat carried by said cavity bottom wall of said piston assembly and thereby opening said "vacuum-valve" aforesaid.

13. The combination according to claim 1 in which said annular valve member carried on the forward face of the valve flange aforesaid comprises: an annular resilient O-ring in truncated cross section with the base portion embedded in an annular surface groove formed in the forward face of said valve flange, and the exterior portion of said O-ring defines the aforesaid valve face which cooperates with the valve seat carried by said cavity bottom wall, said surface groove being characterized by a pair of radially diverging walls to stabilize the embedded base portion in said surface groove.

14. The combination according to claim 1 in which the aforesaid annular valve member is predeterminately spaced normally with respect to an annular resilient valve seat detachably disposed contiguously to the inner face of the peripheral margin of the cavity bottom wall aforesaid, and means for stabilizing said last-defined valve seat against said inner face.

15. The combination according to claim 2 in which said piston assembly and chamber enclosure additionally comprise: an annular flange in semicircular cross section defining the outer periphery of said closure plate and which is offset from the confronting side portion of the first-defined cup-shaped member to produce an annular entrance to an annular channel of similar configuration, a flexible power-diaphragm of annular configuration supported on said first-defined cup-shaped member, said power-diaphragm having an inner annular bead defining the inner periphery thereof and which is received into the aforesaid semicircular channel under compression to effect an airtight seal therebetween with the normal thickness of the wall of said diaphragm radially extending outwardly through said entrance to encompass the first-defined cup-shaped member, a pair of radially spaced circularly aligned looped segments defining the outer peripheral margin of said diaphragm with the inner looped segment normally positioned between the piston assembly flange and inner surface of the peripheral margin defining the open end of the member having greater depth, with its closed end projecting forwardly, the outer looped segment being disposed between the outer surface of the peripheral margin defining the open end of the member having greater depth and the inner surface of the peripheral margin defining the open end of the member having lesser depth, with its closed end contiguous to the extreme end of the peripheral margin defining the open end of the member having greater depth, an annular shouldered bead defining the outer periphery of said outer looped segment, said shouldered bead lying in intimate adjacency with the extreme end of the peripheral margin defining the open end of the member having lesser depth, whereby said outer looped segment and peripheral margins defining the open ends of said pair of cup-shaped members and said flange of said third cup-like member are tightly overlapped in circular alignment to produce an airtight seal therebetween in a rigid unitary assembly, a plurality of circumferentially spaced rectangular embossments formed in the peripheral margin of the open end of said member having lesser depth to define a like-plurality of longitudinal cavities having a flat top wall, a transverse slot formed in the flat wall of each of said cavities, respectively, a corresponding plurality of detachable springy locking tabs in L-shaped cross section and having a vertical segment and an angular springy locking segment, said vertical segment projecting through said slots, respectively, to the exterior of said flat walls to stabilize said locking segment, the springy characteristic of the latter enabling radial inward and outward movements relative to said vertical segment, a corresponding plurality of rectangular openings provided in the peripheral margin of the open end of said member having greater depth, in circular alignment with respect to said locking segments for the latter to automatically project into their respective openings to engage the free end of said locking segments with the cooperating working edges of said openings, respectively, a corresponding plurality of open end slots formed in the shouldered bead of said flexible diaphragm and coextensive with said embossments, respectively, to enable said locking segments under radially inward bias to engage the aforesaid working edges and thereby locking said pair of cup-shaped members in a unitary assembly, the open end of said last-defined slots enabling insertion of a tool against the underside of said locking segments to force them radially outwardly to disengage from said working edges and thereby effecting disconnection of said pair of cup-shaped members for disassembly thereof.

16. A differential pressure motor having a housing, a work-performing output element movable relatively to said housing, wall means movable in said housing from normal released position under a pressure differential at opposite sides of said means to move said output element in part, control valve means characterized by a pair of cooperable telescopically-related fluid-controlling elements manually movable as a unit relatively to said wall means from unapplied position wherein said outer control element is normally spaced from the latter and the inner control element in engagement with said outer control element, and subsequently movable relatively to each other to applied position wherein the inner control element is disengaged from the outer control element stabilized in engagement with said wall means to create said pressure differential at opposite sides of said wall means effective to move the latter in a work-performing direction, force and reaction-transmitting mechanism in continuous engagement with said wall means, said output element and said inner control element, and providing mechanical connections, respectively, therebetween whereby a certain portion of said mechanism is adapted to move as a unit with said inner control element, a variable work-load resistance produced in response to movement of said output element in a work-performing direction under initial unitary movement of said pair of control elements as aforesaid, such resistance upon reaching a predetermined magnitude being effective to substantially arrest movement of said output element and thereby conditioning said valve means for relative movement of said pair of control elements to said applied position under additional manual force on said inner control element with said outer control element stabilized as aforesaid to control follow-up movement of said wall means in said work-performing direction, spring means including a normally compressed spring reacting between said pair of control elements to enable initial unitary movement thereof under normal rate of compressive deflecting of said spring and the latter subsequently yielding under an abnormal rate of compressive deflection to accommodate relative movement therebetween under additional manual movement of the inner control element, reaction from said resistance via said output element being transmittable through said force and reaction-transmitting mechanism to said inner control element for predictable control over the work-load aforesaid, and another spring means including a normally compressed spring reacting between said housing and inner control element for biasing the latter into engagement with the outer control element in cooperation with said first-defined spring means, and for biasing said pair of control elements upon engagement thereof and said wall means as a unit independently of said first-defined spring means, to their respective unapplied and normal released positions.

17. A differential pressure motor having a housing, a work-performing output element movable relatively to said housing, wall means movable in said housing from normal released position under a pressure differential at opposite sides of said wall means to move said output element in part, control valve means characterized by a pair of cooperable telescopically-related fluid-controlling elements manually movable as a unit relatively to said wall means from unapplied position wherein said outer control element is normally spaced from the latter and the inner control element in engagement with said outer control element, and subsequently movable relatively to each other to applied position wherein the inner control element is disengaged from the outer control element stabilized in engagement with said wall means to create said pressure differential at opposite sides of said wall means effective to move the latter in a work-performing direction, force and reaction-transmitting mechanism in continuous engagement with said wall means, said output element and said inner control element, and providing mechanical connections, respectively, therebetween whereby a certain portion of said mechanism is adapted to move as a unit with said inner control element, a variable work-load resistance produced in response to movement of said output element in a work-performing direction under initial unitary movement of said pair of control elements as aforesaid, such resistance upon reaching a predetermined magnitude being effective to substantially arrest movement of said output element and thereby conditioning said valve means for relative movement of said pair of control elements to said applied position under additional manual force on said inner control element with said outer control element stabilized as aforesaid to control follow-up movement of said wall means in said work-performing direction, spring means including a normally compressed spring reacting between said pair of control elements to enable initial unitary movement thereof under normal rate of compressive deflection of said spring and the latter subsequently yielding under an abnormal rate of compressive deflection to accommodate relative movement therebetween under additional manual movement of the inner control element, reaction from said resistance via said output element being transmittable through said force and reaction-transmitting mechanism to said inner control element for predictable control over the work-load aforesaid, another spring means including a normally compressed spring reacting between said wall means and said inner control element for biasing the latter into engagement with said outer control element in cooperation with said first-defined spring means, and for biasing said pair of control elements upon engagement thereof toward their unapplied position, and third spring means including a normally compressed spring continuously reacting directly between said housing and said wall means for biasing the latter toward normal released position independently of said first and second-defined spring means.

18. The differential pressure motor according to claim 17 in which the normal rate of compressive deflection of said other spring means is less than that of said third spring means thereby enabling initial unitary movement aforesaid of said pair of control elements relative to said wall means yieldably stabilized in normal released position under said third spring means characterized by a normal rate of compressive deflection greater than that of said other spring means.

19. The differential pressure motor according to claim 17 in which the normal rate of compressive deflection of said other spring means is greater than that of said first-defined spring means thereby enabling initial unitary movement aforesaid of said pair of control elements and said wall means to produce a workload resistance of such magnitude that movement of said output element becomes substantially arrested to condition said pair of control elements for relative movement aforesaid, said third spring means having a normal rate of compressive deflection less than that of said other spring means.

20. A differential pressure motor having a housing, a work-performing output element movable relatively to said housing, wall means movable in said housing from normal released position under a pressure differential at opposite sides of said wall means to move said output element in part, control valve means characterized by a pair of cooperable telescopically-related fluid-controlling elements manually movable as a unit relatively to said wall means from unapplied position wherein said outer control element is normally spaced from the latter and the inner control element in engagement with said outer control element, and subsequently movable relatively to each other to applied position wherein the inner control element is disengaged from the outer control element stabilized in engagement with said wall means to create said pressure differential at opposite sides of said wall means effective to move the latter in a work-performing direction, force and reaction-transmitting mechanism in continuous engagement with said wall means, said output element and said inner control element, and providing mechanical connections, respectively, therebetween whereby a certain portion of said mechanism is adapted to move as a unit with said inner control element, a variable work-load resistance produced in response to movement of said output element in a work-performing direction as aforesaid, such resistance upon reaching a predetermined magnitude being effective to substantially arrest movement of said output element and thereby conditioning said valve means for relative movement of said pair of control elements to said applied position under additional manual force on said inner control element with said outer control element stabilized as aforesaid to control follow-up movement of said wall means in said work-performing direction, a manually-operable input element engageable with said inner control element to actuate the same, a ported plate carried by said input element in spaced relation to said inner control element, a stop element on said outer control element engageable by said ported plate when in normal position, an internal annular shoulder on said outer control element, first spring means including a normally compressed spring reacting between said ported plate and said shoulder to bias said ported plate into engagement with said stop element and thereby subjecting the outer control element and input element to a normal spring load enabling the latter and said pair of control elements to have initial unitary movement aforesaid, said spring yielding under an abnormal spring load to accommodate relative movement of said input element and inner control element with respect to said outer control element to said applied position upon additional manual operation of said input element, and second spring means including a normally compressed spring reacting between said housing and inner control element to sequentially bias the latter into engagement with said outer control element and said wall means toward released position, and to bias said pair of control elements as a unit upon engagement thereof toward unapplied position, reaction on said output element being transmittable through said force and reaction-transmitting mechanism to said inner control element for predictable control over the work-load aforesaid under joint control of said wall means and said manual input element.

21. A differential pressure motor having a housing, a work-performing output element movable relatively to said housing, wall means movable in said housing from normal released position under a pressure differential at opposite sides thereof to move said output element in part, control valve means characterized by a pair of cooperable telescopically-related fluid-controlling elements manually movable as a unit relatively to said wall means from unapplied position wherein said outer control elemen is normally spaced from the latter and the inner control element in engagement with said outer control element, and subsequently movable relatively to each other to applied positions wherein the inner control element is disengaged from the outer control element stabilized in engagement with said wall means to create said pressure differential at opposite sides of said wall means effective to move the latter in a work-performing direction, force and reaction-transmitting mechanism in continuous engagement with said wall means, said output element and said inner control element, and providing mechanical connections, respectively, therebetween whereby a certain portion of said mechanism is adapted to move as a unit with said inner control element, a variable work-load resistance produced in response to movement of said output element in a work-performing direction as aforesaid, such resistance upon reaching a predetermined magnitude being effective to substantially arrest movement of said output element and thereby conditioning said valve means for relative movement of said pair of control elements to said applied position under additional manual force on said inner control element with said outer control element stabilized as aforesaid to control follow-up movement of said wall means in said work-performing direction, a manually-operable input element engageable with said inner control element to actuate the same, a ported plate carried by said input element in spaced relation to said inner control element, a stop element carried by said outer control element engageable by said ported plate when in normal position, an internal annular shoulder on said outer control element, first spring means including a normally compressed spring reacting between said ported plate and shoulder to bias said ported plate into engagement with said stop element and thereby subjecting the outer control element and input element to a normal spring load enabling the latter and said pair of control elements to have initial unitary movement aforesaid, said spring yielding under an abnormal spring load to accommodate relative movement of said input element and inner control element with respect to said outer control element to said applied position upon additional manual operation of said input element, second spring means including a normally compressed spring reacting between said wall means and inner control element to sequentially bias the latter into engagement with said outer control element and said pair of control elements as a unit upon engagement thereof toward unapplied position, and third spring means including a normally compressed spring continuously reacting between said housing and said wall means to bias the latter toward normal released position, reaction on said output element being transmittable through said force and reaction-transmitting mechanism to said inner control element for predictable control over the work-load aforesaid under joint control of said wall means and said manual input element.

22. The pressure differential motor constructed in accordance with claim 21 in which said force and reaction-transmitting mechanism comprises: a plurality of circumferentially spaced radially disposed levers, a member fast on said wall means and provided with a like-plurality of rectangular transverse slots for pivotal connection with the outer ends of said levers, respectively, another member carried by said inner control element and provided with a like-plurality of transverse slots for pivotal connection with the inner ends of said levers, respectively, a pressure member carried by said inner control element in axially spaced normal relation to said other member and having a like-plurality of radial projections engaging intermediate portions on said levers, respectively, on the sides of the latter opposite said outer and inner pivotal connections, said pressure member being adapted to continuously act on the output element aforesaid whereby reaction on the latter is transmittable to said levers reacting through their pivotal connections with said wall means and inner control element to provide a proportional division of work between said inner control element and said wall means in accordance with the effective leverage ratio.

23. As pressure differential booster motor having a housing characterized by a pair of spaced end walls provided with central coaxial openings, respectively, a work output element projecting through one of said openings, wall means in said housing effective to divide the interior of said housing into a constant pressure chamber and a variable pressure chamber, and movable from normal released position in a work-producing direction under a pressure differential in said chambers, control valve means having a pair of cooperable telescopically-related fluid-controlling elements normally under a predetermined spring load and manually movable as a unit and relatively to each other, an elongated portion on the outer control element projecting through the other opening aforesaid to the exterior of said housing, a plurality of force and reaction-transmitting levers having pivotal engagement with said wall means, said inner control element and said output element to enable said inner contol element under manual actuation to apply reduced force through said levers on said output element in accordance with the effecitve leverage ratio between said wall means and inner control element, a pressure differential operated actuator having a variable power chamber effective on said outer control element to move said pair of contol elements as a unit under said spring load toward said wall means and simultaneously moving the inner ends of said levers on their pivotal connections with said wall means with proportional movement imparted to said output element in a work-performing direction to take up the slack between said pair of control elements moving as a unit, said levers and output element, in opposition to work resistance reacting on the latter in readiness for additional manual actuation of said inner control element relative to said outer control element to create said pressure differential in said constant and variable pressure chambers effective to move said wall means to effect the major portion of said work-load, and a passage between said variable power chamber and said variable pressure chamber.

24. The pressure differential booster motor constructed in accordance with claim 23 in which the power member of said actuator comprises: a tubular bellows member encircling the normal exterior portion of said elongated portion on said outer control element with opposite ends thereof connected airtight to the marginal portion defining the other opening aforesaid, said power chamber being disposed between the interior of said bellows member and outer cylindrical surface of said outer control element in annular configuration and thereby enabling negative (vacuum) pressure from said variable pressure chamber to communicate via said last-defined passage with said power chamber to produce a pressure differential at opposite sides of said bellows member effective to collapse the latter radially and longitudinally to displace the outer and inner control elements as a unit toward said wall means to place the force and reaction-transmitting mechanism and output element under work resistance according to the thrust-transmitting capacity of the spring load between said pair of control elements, said bellows member being relaxed upon increasing pressure in the variable pressure chamber effective to activate said wall means.

25. A pressure differential booster motor having a housing, wall means movable in said housing from normal released position under a pressure differential at opposite sides thereof, a movable power output element characterized by first and second stages of movement, a movable manual input element, control valve means on one side of said wall means and which are characterized by a pair of interfitting fluid-controlling elements provided with two cooperable pairs of fluid-controlling portions therebetween and between said wall means and one of said control elements, respectively, said pair of control elements being movable as a unit and relatively in that order from normal unapplied position, unitary movement being effective to dispose the pair of control portions between said wall means and said one control element in engaging (closed) position wherein pressures at opposite sides of said wall means are isolated, and relative movement being effective under said manual input element to maintain the last-defined pair of control portions closed and to disengage (open) the pair of control portions between said pair of control elements to admit atmospheric pressure to one side of said wall means and thereby creating said pressure differential to move the latter from released position, force and reaction transmitting mechanism comprising: a lever assembly having a plurality of radially disposed levers pivotally connected mechanically at their outer and inner ends to said wall means and to said other control element, respectively, and their intermediate portions bearing on a flanged pressure member movable as a unit with said output element, a normally compressed spring reacting between said pair of control elements to enable unitary movement thereof, said spring being yieldable to accommodate relative movement between said pair of control elements under additional manual force exerted on said input element, another normally compressed spring continuously reacting on said other control element in cooperation with said first-defined spring to sequentially bias said other control element toward said one control element to engage (close) the pair of control portions therebetween, and to bias said pair of control elements as a unit toward normal unapplied position, first stage movement of said output element being effective to substantially arrest movement thereof upon producing a predetermined work resistance solely under initial movement of said input element and thereby conditioning said pair of control elements for relative movement aforesaid under augmented manual force exerted on said input element to open said pair of control portions between said pair of control elements to subject said wall means to said pressure differential at opposite sides thereof to effect second stage movement of said output element jointly with said input element in accordance with the division of work defined by the effective leverage ratio in said lever assembly.

26. A pressure differential booster motor having a housing, wall means movable in said housing from normal released position under a pressure differential at opposite sides thereof, a movable power output element characterized by first and second stage of movement, a movable manual input element, control valve means on one side of said wall means, which are characterized by a pair of interfitting fluid-controlling elements provided with two cooperable pairs of fluid-controlling portions, respectively, therebetween and between said wall means and one of said pair of control elements, respectively, the latter being movable as a unit and relatively in that order from normal unapplied position under said input element, unitary movement being effective to dispose the pair of control portions between said wall means and said one control element in engaging (closed) position wherein pressures at opposite sides, respectively, of said wall means are isolated, and relative movement being effective to maintain the last-defined pair of control portions closed and to disengage (open) the other pair of control portions between said pair of control elements to admit atmospheric pressure to one side of said wall means and thereby creating the aforesaid pressure differential effective to move the latter from released position in a work-producing direction, a force and reaction-transmitting lever assembly operably disposed on the other side of said wall means in coaxial relation, and including a plurality of radially disposed levers pivotally connected mechanically at their outer and inner ends to said wall means and to said other control element, respectively, and their intermediate portions bearing on a flanged pressure member movable as a unit with said output element, a normally compressed spring reacting between said pair of control elements to enable unitary movement thereof, said spring yielding to accommodate relative movement therebetween under additional manual force exerted on said input element, another normally compressed spring continuously reacting on said other control element in cooperation with said first-defined spring to sequentially bias the other control element toward the one control element to engage (close) the pair of control portions, respectively, therebetween, and to bias said pair of control elements upon engagement thereof as a unit toward normal unapplied position wherein said second-defined pair of control portions is disengaged (open) to restore balanced pressures at opposite sides of said wall means, first state movement of said output element being effective to substantially arrest movement thereof upon producing a predetermined work resistance solely under initial movement of said input element and thereby conditioning said pair of control elements for relative movement aforesaid under augmented manual force exerted on said input element to disengage (open) said pair of control portions between said pair of control elements to subject said wall means to said pressure differential at opposite sides thereof and thereby effecting second stage movement of said output element jointly with said input element in accordance with the division of work defined by the leverage ratio in said lever assembly, and automatic means operably associated with said one control element for effecting unitary movement of said pair of control elements in part to take up the slack between the operating parts aforesaid.

27. The pressure differential motor constructed in accordance with claim 26 including a hollow extension having a socket end and an open end in coaxial relation with respect to said other control element, an abutment element fast on said one control element, and an abutment member carried by said extension on the open end portion thereof, and which is manually adjustable axially along said extension to establish different relative positions thereof, said first-defined spring being adapted to react between said abutment element and member to bias said pair of control elements toward each other to engage (close) the other pair of control portions between said pair of control elements in accordance with the normal rate of compressive deflection defined by the adjusted relative position of said abutment member.

28. The pressure differential motor constructed in accordance with claim 27 including a threaded connection between said abutment member and extension effective to axially move the latter relatively to said extension in response to manual rotation at will.

29. A pressure differential motor having a housing, a movable power output element, a movable manual input element, control valve means having a pair of telescopic fluid-controlling elements, a power member movable in said housing and a force and reaction-transmitting lever assembly characterized by a plurality of radially disposed levers with their outer and inner end portions pivotally connected mechanically to said power member and inner control element, respectively, and their intermediate portions bearing on a pressure flange movable with said output element as a unit, an energizable actuator including means for energizing the same operatively related with the outer control element to initially move the same to take up the slack between the aforesaid pair of control elements, power member and lever assembly as a function of said output element initially moving to create a predetermined work resistance effective to substantially halt such movement under balanced pressures effective at opposite sides of said power member.

30. A power unit having a housing, a variable power output element, a movable manual input element, a power member movable in said housing from normal released position, control means for said power member, a force and reaction-transmitting lever assembly having a plurality of radially disposed levers with their outer and inner end portions pivotally connected mechanically to said power member and a portion of said control means, respectively, and their intermediate portions bearing on a pressure flange movable with said output element as a unit, an energizable actuator including means for energizing the same operatively related with a different portion of said control means to initially move the latter to take up the slack between the latter, said power member and lever assembly automatically as a function of said output element initially moving to create a predetermined work resistance effective to substantially halt such movement under balanced pressures effective at opposite sides of said power member.

31. A power unit having a housing, a variable power output element, a movable manual input element, a power member movable in said housing from normal released position, control means for said power member and having a pair of relatively movable control elements, a force and reaction-transmitting lever assembly having a plurality of radially disposed levers with their outer and inner end portions pivotally connected mechanically to said power member and one of said control elements, respectively, and their intermediate portions bearing on a pressure flange movable with said output element as a unit, an energizable actuator including means for energizing the same operatively related with said other control element to initially move the same to partially activate the unapplied position of said control means and thereby taking up the slack between the latter, said power member and lever assembly automatically as a function of said output element initially moving to create a predetermined work resistance effective to substantially halt such movement under balanced pressures effective at opposite sides of said power member.

32. A control valve mechanism for use in follow-up cooperation with wall means movable under influence of a pressure differential at opposite sides thereof created in a pair of pressure chambers, a source of pressure different from atmosphere continuously communicating with one of said chambers and the other chamber being selectively communicable with said one chamber and the atmosphere to produce said pressure differential, and an outer and an inner poppet-type valve element, each having an annular valve face with the latter on the outer valve element normally spaced from a complemental valve seat on said wall means, and the valve face on said inner valve element being normally in engagement with a complemental valve seat on said valve element, the improvement which comprises: a coaxial bore coextensive with said outer valve element and an annular partition wall medially disposed in said bore to define an inner cylindrical air chamber in which said inner valve element slidably interfits in part, and an outer cylindrical air chamber, a circular coaxial opening defining the inner periphery of said partition wall, and which is adapted to interconnect said inner and outer air chambers, said valve seat engageable by said inner valve element being disposed on the confronting side of said partition wall to produce an air-control chamber in said inner valve element, and which is continuously in communication with said opening in said partition wall, a variable pressure chamber between the exterior of the valve face portion on said inner valve element and the confronting portion of said bore defining the inner air chamber, a plurality of longitudinal surface channels indented in said inner valve element in continuous communication with said variable pressure chamber via an annular surface channel adapted to interconnect said first-defined surface channels, a pair of diametrically-opposed air ports through the wall of said outer valve element for maintaining communication between said other chamber and said variable pressure chamber, the latter being selectively connectible to said one chamber when the valve face on said outer valve element is spaced from its complemental valve seat on said wall means, and connectible to atmosphere when the face on said inner valve element is disengaged from its complemental seat carried by said partition wall aforesaid, a normally compressed spring reacting between said pair of valve elements to bias them toward each other and thereby engaging the valve face on said inner valve element with its complemental valve seat carried by said partition wall, another normally compressed spring reacting between a member fixed relatively to said inner valve element for sequentially biasing said inner valve element in cooperation with said first-defined spring toward engagement with its complemental valve seat carried by said partition wall, and said pair of valve elements as a unit to separate said valve face on said outer valve element from its complemental valve seat on said wall means, the normal rate of compression deflection of the first-defined spring being greater than that of the last-defined spring thus enabling unitary movement of said pair of valve elements to stabilize the outer valve element in engagement with its complemental seat on said wall means to condition relative movement of said inner valve element with respect to said outer valve element to create the aforesaid pressure differential, a pair of abutment-engaging elements carried by said outer valve element and wall means, respectively, for limiting the aforesaid space normally obtaining between the valve face on said outer valve element and its complemental valve seat on said wall means, said inner valve element projecting through said outer air chamber, an air filter unit mounted adjacent the outer open end of said outer air chamber, and a manual input element projecting through said air filter unit, said outer air chamber and opening through said partition wall, into engagement with said inner valve element to actuate the latter.

33. The control valve mechanism constructed in accordance with claim 32 in which said fixed member comprises: a portion of a housing in which said wall means is movably disposed.

34. The control valve mechanism constructed in accordance with claim 33 in which said housing includes a central annular opening through which the end portion of said outer valve element opposite its valve face, slidably projects to the exterior of said housing to support said pair of valve elements, and a central opening in said wall means in coaxial relationship with respect to said opening in said housing, and a portion of said inner valve element slidably projecting through the opening in said wall means to support the latter.

35. The control valve mechanism constructed in accordance with claim 32 including an annular shoulder on said inner valve element in longitudinally spaced relation to the side of said partition wall opposite the side on which said valve face of said inner valve element bears, said first-defined spring being disposed between said opposite side of said partition wall and last-defined shoulder to react therebetween to bias said pair of valve elements toward each other and thereby engaging the valve face on said inner valve element with the valve seat bearing on said partition wall.

36. The control valve mechanism constructed in accordance with claim 32 including a truncated socket formed coaxially in said inner valve element, the open end of which defines the aforesaid valve face on the latter, a truncated hollow member having a closed socket end nested in the said first-defined socket, and projecting through the opening in said partition wall substantially coextensive with the outer air chamber aforesaid, means for interlocking the socket portions in said inner air valve element and said truncated member to move axially as a unit, an outstanding annular flange defining the open end of said truncated member and which is longitudinally spaced from the confronting side of said partition wall in alignment therewith, said first-defined spring being operably disposed between said outstanding flange and side of said partition wall to react therebetween and thereby biasing said pair of valve elements toward each other to engage the valve face on said inner valve element with the valve seat bearing on the opposite side of said partition wall, said manual input element being adapted to project through the hollow of said truncated member into engagement with the socket end therein to actuate said inner valve element toward applied position in opposition to reaction from the two springs aforesaid.

37. The control valve mechanism constructed in accordance with claim 36 in which said interlocking means comprise: a plurality of locking tabs spaced from the socket end in said truncated member and which is extruded out of the conical wall defining said socket end, to project toward the open end of said truncated member, and a corresponding plurality of notches indented in the aforesaid socket in said inner valve element and engageable by the free ends of said locking tabs, respectively, to lock said inner valve element and truncated member to move axially as a unit.

38. A control valve mechanism for use in follow-up cooperation with wall means movable under influence of a pressure differential at opposite sides thereof created in a pair of pressure chambers, a source of pressure different from atmosphere continuously communicating with one of said chambers and the other chamber being selectively communicable with said one chamber and with the atmosphere to produce said pressure differential, and an outer and an inner poppet-type valve element, each having an annular face with the valve face on the outer valve element normally spaced from a complemental valve seat on said wall means to produce a "vacuum-valve," and the valve face on said inner valve element being normally in engagement with a complemental valve seat on said outer valve element to produce an "air-valve," the improvement which comprises: a coaxial bore coextensive with said outer valve element and an annular partition wall medially disposed in said bore to define an inner cylindrical air chamber in which said inner valve element slidably interfits in part, and an outer cylindrical air chamber in coaxial relationship to said inner air chamber, and a circular coaxial opening defining the inner periphery of said partition wall, and interconnecting said inner and outer air chambers, said valve seat engageable by said inner valve element being disposed on the confronting side of said partition wall to produce an air-control chamber in said inner valve element, said latter chamber being continuously in communication with said opening in said partition wall, a variable pressure chamber between the exterior of the valve face portion on said inner valve element and the confronting portion of said bore defining the inner air chamber, a plurality of longitudinal surface channels indented in said inner valve element in continuous communication with said variable pressure chamber via an annular surface channel in said inner valve element and adapted to interconnect said first-defined surface channels, a pair of diametrically-opposed air-ports through the wall of said outer valve element for maintaining communication between said other chamber and said variable pressure chamber, the latter being selectively connectible to said one chamber when the valve face on said outer valve element is spaced from its complemental valve seat on said wall means, and connectible to atmosphere when the valve face on said inner valve element is separated from its complemental valve seat on the confronting side of said partition wall, a normally compressed spring operably incorporated in said outer air chamber, another normally compressed spring reacting between a member fixed relatively to said inner valve element for sequentially biasing the latter in cooperation with said first-defined spring toward engagement with its complemental valve seat on the confronting side of said partition wall, and said valve elements as a unit to separate the valve face on said outer valve element from its complemental valve seat on said wall means, the normal rate of compressive deflection of the first-defined spring being greater than that of the last-defined spring thus enabling unitary movement of said valve elements to stabilize the outer valve element in engagement with its complemental valve seat on said wall means to condition relative movement of said inner valve element with respect to said outer valve element and wall means to disengage the valve face on the latter valve element from its complemental valve seat on said outer valve element to create the aforesaid pressure differential, a pair of abutment-engaging elements carried by the outer valve element and said wall means, respectively, for limiting separation between the valve face on the outer valve element and its complemental valve seat on said wall means, an annular air filter device mounted at the outer open end of said outer air chamber, a manual input element projecting through said air filter device, said outer air chamber and opening defined by said partition wall, into engagement with said inner valve element to actuate the latter, a detachable abutment flange carried by said input element in axially spaced relationship to the end of the latter engageable with said inner valve element, said first-defined spring being operably disposed between said abutment flange and confronting side of said partition wall to spring load said input element and said outer valve element, and an internal groove formed in the outer air chamber adjacent the outer end thereof for reception of a retaining ring engageable by said abutment flange to establish the normal spring load aforesaid.

39. The control valve mechanism constructed in accordance with claim 38 including a hollow extension having a socket end and an open end in coaxial relation with respect to said inner valve element, and which projects rearward through said outer air chamber, and abutment member carried by said extension and which is manually adjustable axially along the latter to define different relative positions thereof, an abutment element fast on said outer valve element, said first-defined spring being adapted to react between said abutment member and element to bias said valve elements toward each other whereby the normal rate of compressive deflection of said first-defined spring is selectively variable at will in accordance with the manually adjusted relative position of said abutment member, the free end of said manual input element being adapted to engage the bottom of said socket end to actuate said inner valve element, a longitudinal surface groove provided in the engaging end portion of said input element, and a pin projecting under a pressfit through a radial bore formed in said inner valve element to loosely engage its inner end portion with said last-defined groove and thereby stabilizing said input element against relative rotation with respect to said extension and accommodating universal relative movement of the former to enable relative manual rotation of said abutment member to effect the aforesaid change in the normal rate of deflection of said first-defined spring.

40. The control valve mechanism constructed in accordance with claim 39 in which said abutment member is formed in L-shaped cross section defining a vertical abutment segment and an elongated hex-profiled sleeve projecting from the inner periphery of said abutment segment, and a threaded connection between said sleeve and extension to effect relative axial adjustment of said abutment member along said extension in response to manual rotation of the former at will.

41. The control valve mechanism constructed in accordance with claim 38 in which the engaging end of said input element is pivotally connected to said inner valve element to move as a unit in both directions whereby the last-defined spring cooperates with the first-defined spring to sequentially bias the inner valve element into seated engagement with said outer valve element and the latter as a unit with the former upon such seating engagement to establish said valve elements in normal unapplied position.

42. The control valve mechanism constructed in accordance with claim 38 in which the inner terminal portion of said outer valve element defines a bell-shaped flange which carries the valve face normally spaced from the valve seat on said wall means, respectively, and differential pressures created at opposite sides, respectively, of said valve flange upon opening said air-valve to raise pressure in the aforesaid other chamber enables such pressures to supplement manual force applied to said outer valve element via said first-defined spring to maintain said "vacuum-valve" closed during open position of said "air-valve" and when both valves are in lapped closed positions, respectively.

References Cited
UNITED STATES PATENTS

| 2,972,983 | 2/1961 | Ayers | 91—376 XR |
| 3,017,866 | 1/1962 | Stelzer | 91—376 XR |
| 3,292,502 | 12/1966 | Myers et al. | 91—376 XR |

MARTIN P. SCHWADRON, Primary Examiner

R. R. BUNEVICH, Assistant Examiner

U.S. Cl. X.R.

60—54.5; 91—376